United States Patent [19]
Katagiri et al.

[11] Patent Number: 5,966,112
[45] Date of Patent: Oct. 12, 1999

[54] INTEGRATED IMAGE-INPUT TYPE DISPLAY UNIT

[75] Inventors: Masayuki Katagiri, Ikoma; Masafumi Yamanoue, Yamatokooriyama; Hitoshi Nohno, Nabari; Yoshikazu Taniguchi, Tenri; Toshio Nomura, Ichihara, all of Japan

[73] Assignee: Sharp Kabushiki Kaisha, Osaka, Japan

[21] Appl. No.: 08/883,121

[22] Filed: Jun. 26, 1997

[30] Foreign Application Priority Data

Sep. 13, 1996 [JP] Japan ................................. 8-242737

[51] Int. Cl.⁶ .................................................. G09G 3/36
[52] U.S. Cl. .................... 345/104; 345/102; 178/18.1; 178/18.11
[58] Field of Search ............................ 345/87, 102, 104, 345/173; 178/18.1, 18.11

[56] References Cited

U.S. PATENT DOCUMENTS

| | | | |
|---|---|---|---|
| 4,577,189 | 3/1986 | Adolfsson et al. | 345/104 |
| 5,359,155 | 10/1994 | Helser | 178/18.11 |
| 5,381,160 | 1/1995 | Landmeier | 178/18.11 |
| 5,430,462 | 7/1995 | Katagiri et al. | |
| 5,659,332 | 8/1997 | Ishii et al. | 345/104 |

FOREIGN PATENT DOCUMENTS

| | | |
|---|---|---|
| 4-251824 | 9/1992 | Japan . |
| 4-282609 | 10/1992 | Japan . |
| 6-186585 | 7/1994 | Japan . |

*Primary Examiner*—Bipin H. Shalwala
*Assistant Examiner*—Kent Chang
*Attorney, Agent, or Firm*—Nixon & Vanderhye, P.C.

[57] ABSTRACT

An integrated image-input type display unit employs a conventional liquid crystal display panel and is capable of optically writing an original image directly at a high resolution into liquid crystal display panel and electrically reading the image. This unit has an image input/output device comprising a liquid crystal cell which contains light-sensitive molecules. The light-sensitive molecules are capable of changing their structure to a first molecular structure when being irradiated with light of a first wavelength range and to a second molecular structure when being irradiated with light of a second wavelength range, and are further capable of changing their alignment in accordance with the structural change of the light-sensitive molecules.

10 Claims, 21 Drawing Sheets

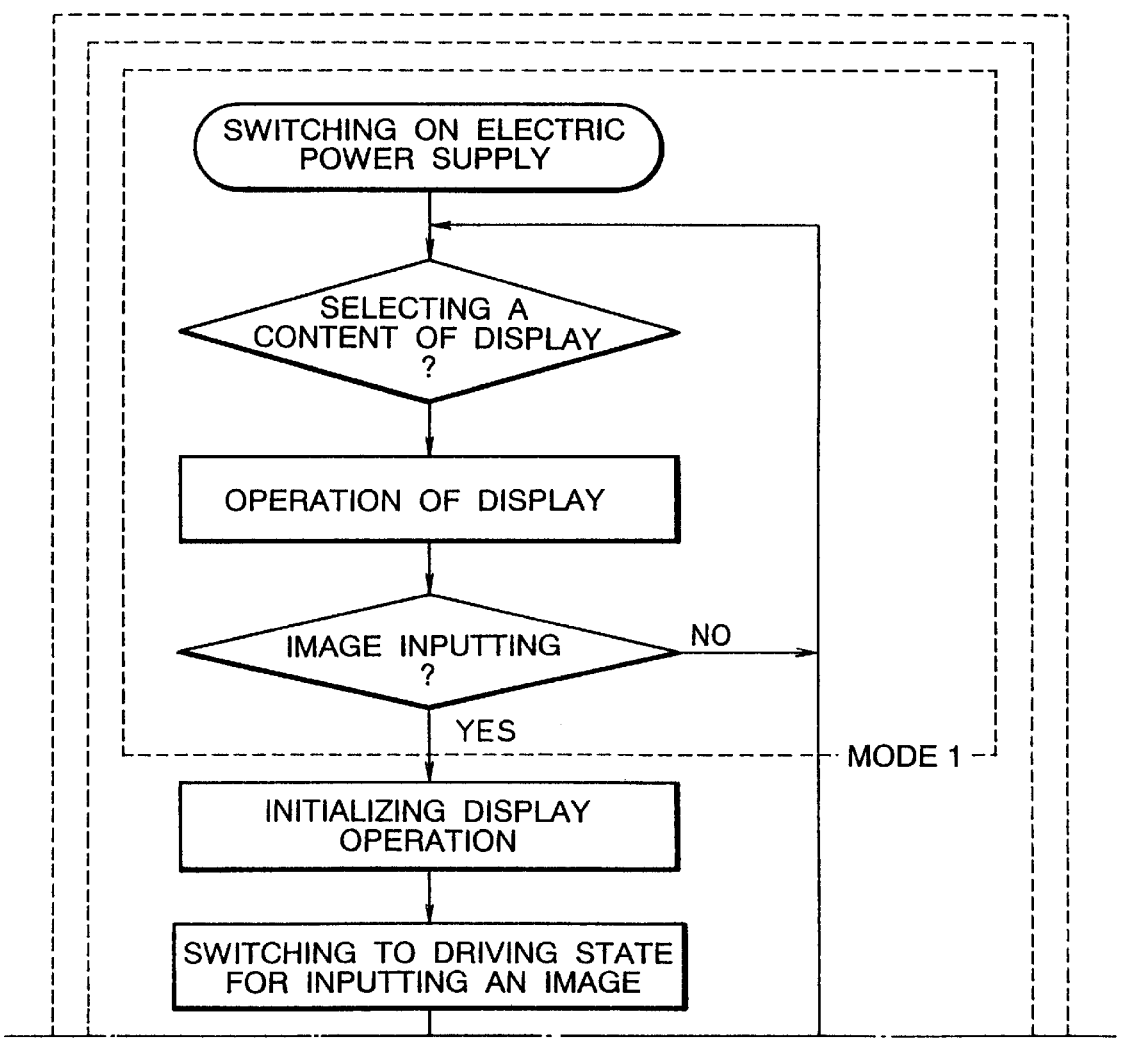

6Azn-PVA

K-311-S$_B$-314-S$_A$-327-I

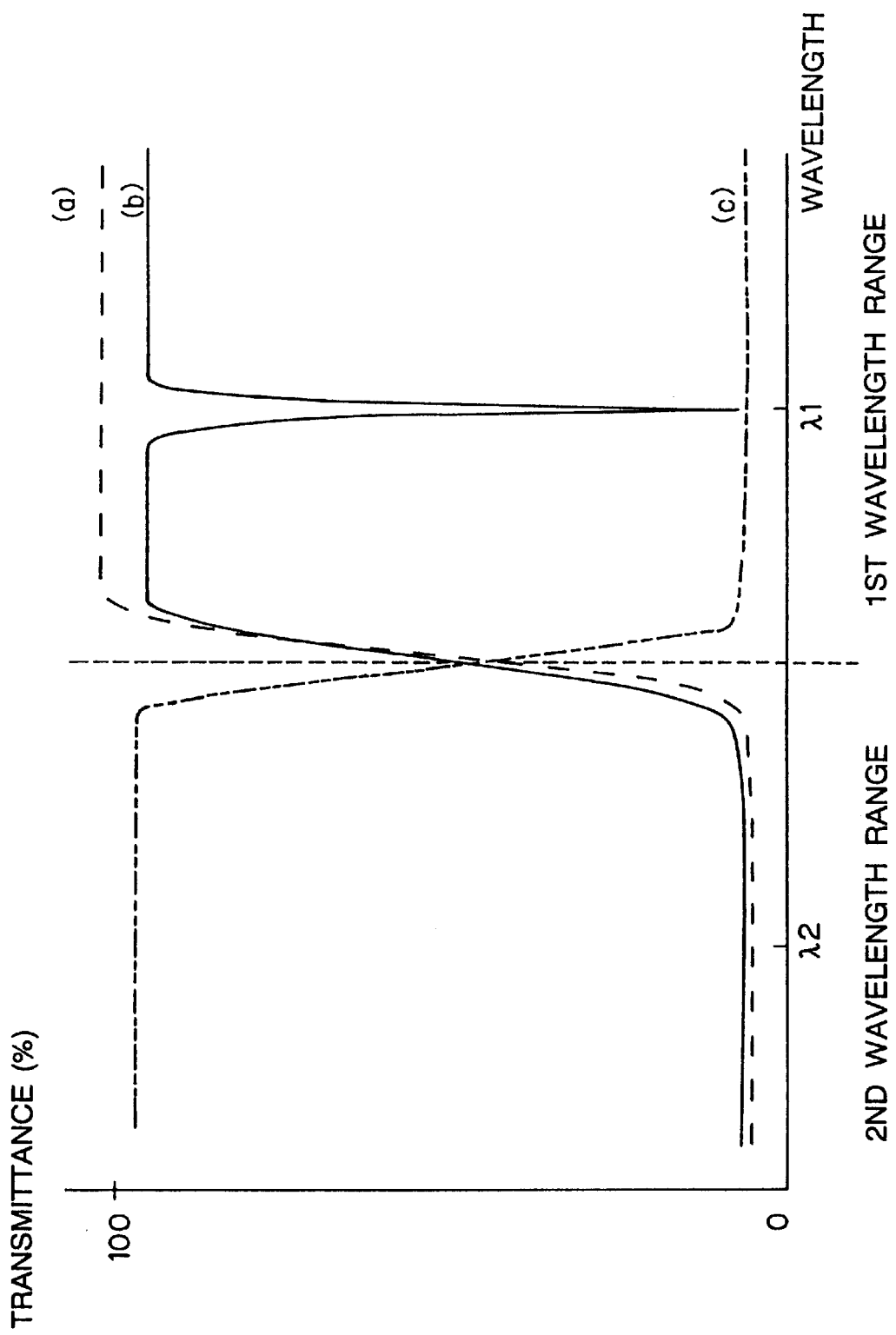

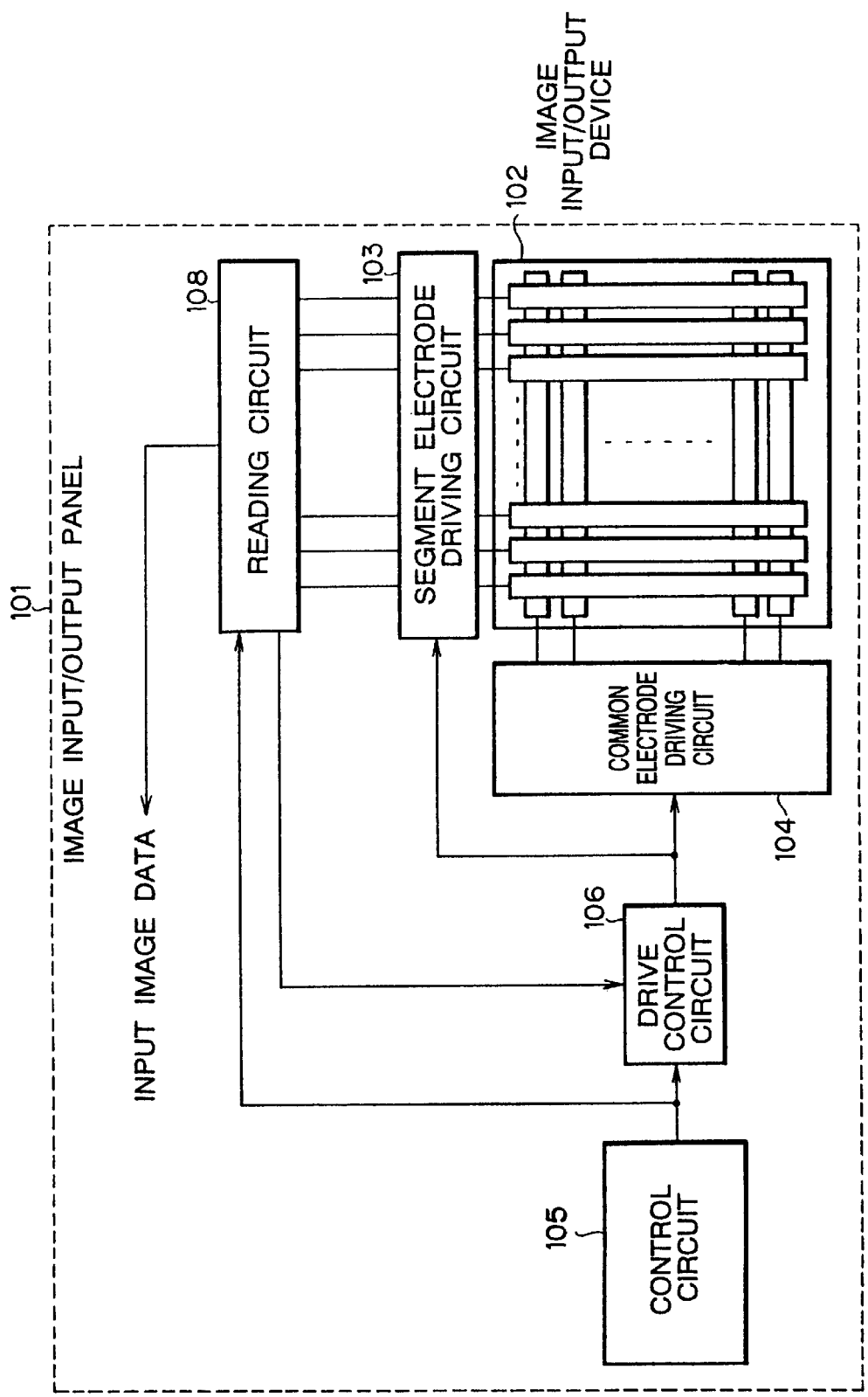

INTEGRATED IMAGE-INPUT TYPE DISPLAY UNIT

BACKGROUND OF THE INVENTION

There have been image-input type display units which can serve both as an image input terminal and an image display each by combining a liquid-crystal display (LCD) panel with a two-dimensional image sensor and which are, for example, disclosed in Japanese Laid-open Patent Publications No. 4-282609 (TOKKAI HEI) and No. 6-186585 (TOKKAI HEI). The display unit described in Japanese Laid-open Patent Publication (TOKKAI HEI) No. 4-282609 comprises a color liquid-crystal display panel, a two-dimensional image sensor mounted on the reverse surface of the color LCD-panel and a light-source. When an original placed on the top surface of the color LCD-panel is illuminated by light emitted from the light source trough the LCD-panel, light reflected from the original through again the LCD-panel is received by the image sensor for reading an image of the original.

The display unit disclosed in Japanese Laid-open Patent Publication (TOKKAI HEI) No. 6-186585 is composed of a LCD panel, an image sensor composed of a photo-diodes formed at grid points of a non-display portion of the LCD-panel and a light-source. This display unit in a similar way as described above reads an image of an original placed on a top surface of the color LCD-panel by illuminating with light emitted from the light source through the panel and by receiving light reflected from the original by a photo-diode.

In the above-mentioned device, the image sensor is formed on another surface than a surface of the color LCD panel where a liquid-crystal driving electrode or a TFT (thin film transistor). In other words, elements different in function are merely laid on each other.

On the other hand, Japanese Laid-open Patent Publication (TOKKAI HEI) No. 4-251824 discloses another display unit wherein a LCD panel and an image sensor are combined with each other more effectively.

This device is constructed of an upper substrate with a non-linear resistive element formed thereon, a lower substrate, liquid-crystals held between the upper substrate and the lower substrate, a polarizer stuck to a top surface of the upper substrate, a polarizer stuck to a bottom surface of the lower substrate, a light-source for a back light and a light-guide plate for leading the light from the light source into the liquid-crystal layer.

The non-linear resistive element sandwiched between a pixel electrode and a signal electrode is in contact with the signal electrode. The lower substrate has a scanning electrode through which it is in contact with the liquid crystal.

The above-mentioned device construction is the same as that of a two-terminal matrix type LCD panel which is represented by a MIM (metal-insulator-metal) diode excepting the former adopting non-linear resistive elements having light-sensitivity.

The optical writing operation of the device is as follows:

The liquid crystal is put into a transparent state and a desired voltage is applied across the pixel electrode and the scanning electrode, then an original is illuminated. Light reflected from the original falls on non-linear resistive elements, those of which received light reflected from white portions of the original reduce its resistance, causing reduction of an effective voltage applied to the liquid crystal molecules which in this case are aligned parallel to the substrates. As light is absorbed by black parts of the original, no light falls on corresponding non-linear resistive elements which have no change in its resistance and therefore keep the liquid crystals as be aligned perpendicular to the substrates. Thus, an image of the original is written directly into the liquid crystal display panel by light.

The electrical image-reading method is as follows:

The non-linear resistive elements are classified into resistive components and capacitive components, which are connected in parallel to each other. The liquid crystals are also classified into resistive components and capacitive components, which are connected in parallel to each other. The non-linear resistive elements are connected in series to the liquid crystals. When reflected light rays from the original image fall on non-linear resistive elements and liquid crystals, resistive components of the resistive elements and capacitive components of the liquid crystals decrease. With a voltage being applied across the pixel electrodes and scanning electrodes, current flowing illuminated pixels may differ in value from current flowing not-illuminated pixels. The written image can be read by detecting differential currents of pixels.

As described above, both the prior art display units provided with an image input facility, which are disclosed in Japanese Laid-open Patent Publications No. 4-282609 (TOKKAI HEI) and No. 6-186585 (TOKKAI HEI), are manufactured each by merely laminating an image sensor on a liquid-crystal display panel. Each device is complicated in structure because of forming a LCD layer (display electrodes) and an image inputting sensor layer (image-inputting electrodes) on different surfaces.

To read an original image and display it on a LCD panel, each device has to convert the optical image into electrical signals through processes of reading the original image by the image sensor, converting electrical signals of the read image into electrical signals for display, displaying the image by electrical signals on the display panel. The device may have errors in the processes resulting in lowering the displayed image quality.

An image displayed on the LCD panel can be restricted in its resolution by either lower one of resolution powers of the image sensor and the LCD panel.

On the other hand, the conventional device with an image input facility, which described in Japanese Laid-open Patent Publication (TOKKAI HEI) No. 4-251824, is constructed on the base of a two-terminal element matrix type LCD panel. This can not be adapted to a TFT-type LCD panel or a simple matrix type LCD panel.

Non-linear resistive elements used for displaying and inputting an original image can not transmit light, so an increase of an area of these elements may darken the display image whilst a decrease of an area of the elements decreases a light-receiving surface area, causing a problem not to obtain large signals of high signal to noise ratio.

The device can optically write an original image into the LCD panel to directly display the image thereon. However, the resolution of the displayed image is restricted by the density of the non-linear resistive elements. In other words, it is limited to the resolution of the LCD panel.

The discrete arrangement of the small-surface non-linear resistive elements may cause a decreased density of input image sampling resulting in increasing an error of the image signal.

SUMMARY OF THE INVENTION

The present invention relates to integrated image-input type display units which is used for personal computers, word processors, pocket-type electronic computers, portable information terminals or other information devices.

This invention is directed to provide an integrated image-input type display unit which is capable of directly writing an original image at a high resolution with light into a liquid crystal display panel which may be a TFT type LCD panel, a simple matrix type LCD panel or two-terminal element matrix type LCD panel and which light-receiving portion is divided into many widely dispersed divisions assuring a high-quality of an input image and a high signal to noise ratio of image signals, attaining an accurate image input with a sufficiently increased sampling density and realizing simple design inexpensive to manufacture.

(1) An object of the present invention is to provide an image-input and display unit which comprises: an image input/output device composed of a liquid-crystal cell, the cell containing light-sensitive molecules capable of changing their structure to a first molecular structure by irradiation with light of a first wavelength and to a second molecular structure by irradiation with light of a second wavelength and liquid crystal molecules capable of changing their alignment in accordance with the structural change of the light-sensitive molecules, both kinds of molecules hermetically sandwiched between two transparent substrates, a first group of electrodes and a second group of electrodes; first electrode-driving means for driving the first group of electrodes; second electrode-driving means for driving the second group of electrodes; illuminating means for irradiating the image input/output device with light of the first wavelength and light of the second wavelength; reading means for reading capacities produced at places corresponding to intersection points formed between the first-group electrodes and the second-group electrodes in accordance with a pulse voltage applied to the first-group electrodes; and control means for controlling the first electrode driving means, the second electrode driving means, the illuminating means and the reading means in such a manner that, when displaying an image, the alignment of the liquid crystal molecules corresponding to intersection points between the first group electrodes and the second group electrodes is changed by irradiating the image input/output device with light of the first wavelength to display a first image on the input/output device and, when inputting an image, a second image is inputted into the input/output device by irradiating with light of the second wavelength, a pulse voltage is applied to the first group of electrodes and capacities at places corresponding to intersection points between the first-group electrodes and the second-group electrodes are read to read the second image.

(2) Another object of the present invention is to provide an integrated image-input type display unit which is constructed as mentioned item (1) above, wherein the light-sensitive molecules are fixed to at least one of two transparent substrates.

(3) Another object of the present invention is to provide an integrated image-input type display unit which is constructed as mentioned item (1) above, wherein the liquid crystal molecules are a mixture of high-molecular liquid crystals and low-molecular liquid crystals and said mixture and the light-sensitive molecules are dispersed in the liquid crystal cell.

(4) Another object of the present invention is to provide an integrated image-input type display unit which is constructed as mentioned item (1) above, wherein the first group electrodes are formed on one of the transparent substrates and the second group electrodes are formed on the other transparent substrate.

(5) Another object of the present invention is to provide an integrated image-input type display unit which is constructed as mentioned item (1) above, wherein the first group electrodes and the second group electrodes are formed on one of the transparent substrates, switching elements are formed one at each of intersection points formed between the first group electrodes and the second group electrodes and a common electrode is formed on the other transparent substrate.

(6) Another object of the present invention is to provide an integrated image-input type display unit which is constructed as mentioned item (1) above, wherein the reading means is composed of voltage detecting means for detecting from the capacity a voltage after the elapse of a certain time and voltage comparing means for comparing the detected voltage value with a specified voltage value.

(7) Another object of the present invention is to provide an integrated image-input type display unit which is constructed as mentioned item (1) above, wherein the reading means is composed of voltage detecting means for detecting a voltage from the capacity and time measuring means for measuring a time until the detected voltage reaches a specified voltage value.

(8) Another object of the present invention is to provide an integrated image-input type display unit which is constructed as mentioned item (1) above, wherein the illuminating means is capable of irradiating the input/output device with light of a third wavelength not to change a state of the light-sensitive molecules when displaying a second image inputted into the input/output device.

(9) Another object of the present invention is to provide an integrated image-input type display unit which is constructed as mentioned item (1) above, wherein the illuminating means uses a common light source capable of generating the first-wavelength light and the second-wavelength light and is provided with light wavelength separating means for separating the first-wavelength light from the second-wavelength light.

(10) Another object of the present invention is to provide an integrated image-input type display unit which is constructed as mentioned item (1) above, wherein the illuminating means uses a common light source capable of generating the first-wavelength light and the second-wavelength light and is provided with light-guide means for irradiating with the first-wavelength light through one of the transparent substrate and with the second-wavelength light through the other transparent substrate.

BRIEF DESCRIPTION OF DRAWINGS

FIG. 3 shows the correct alignment of the drawing sheets for FIGS. 3A and 3B.

FIGS. 3A and 3B are a flow chart describing the system control of an integrated image-input type display unit.

FIG. 17 shows characteristic curves of the light filter shown in FIG. 16.

FIG. 19 is a construction view of a system for reading portion.

PREFERRED EMBODIMENTS OF THE INVENTION

Figure 1:
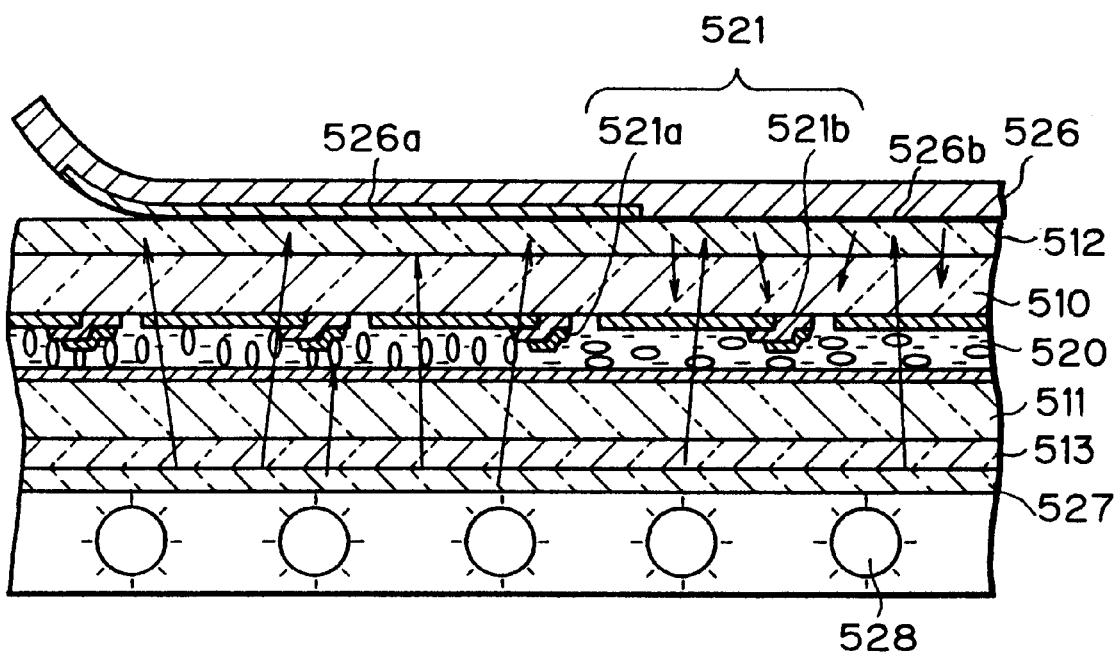
FIG. 1 is a sectional view of a prior art integrated image-input type display unit.

Several integrated image-input type display units according to prior arts will be described first for reference as follows:

There have been image-input type display units which can serve both as an image input terminal and an image display each by combining a liquid-crystal display (LCD) panel with a two-dimensional image sensor and which are, for example, disclosed in Japanese Laid-open Patent Publications No. 4-282609 (TOKKAI HEI) and No. 6-186585 (TOKKAI HEI). The display unit (Japanese Laid-open Patent Publication (TOKKAI HEI) No. 4-282609) comprises a color liquid-crystal display panel, a two-dimensional image sensor mounted on the reverse surface of the color LCD-panel and a light-source. When an original placed on the top surface of the color LCD-panel is illuminated by light emitted from the light source trough the LCD-panel, light reflected from the original through again the LCD-panel is received by the image sensor for reading an image of the original.

The display unit (Japanese Laid-open Patent Publication (TOKKAI HEI) No. 6-186585) comprises a LCD panel, an image sensor composed of a photo-diodes formed at grid points of a non-display portion of the LCD-panel and a light-source. This device in a similar way as described above reads an image of an original placed on a top surface of the color LCD-panel by illuminating with light emitted from the light source through the panel and by receiving light reflected from the original by a photo-diode.

In the above-mentioned device, the image sensor is formed on another surface than a surface of the color LCD panel where a liquid-crystal driving electrode or a TFT (thin film transistor). In other words, elements different in function are merely laid on each other.

On the other hand, Japanese Laid-open Patent Publication (TOKKAI HEI) No. 4-251824 discloses another display unit wherein a LCD panel and an image sensor are combined with each other more effectively.

This device is constructed of an upper substrate 510 with a non-linear resistive element 521 formed thereon, a lower substrate 511, liquid-crystal 520 held between the upper substrate 510 and the lower substrate 511, a polarizer 512 stuck to a top surface of the upper substrate 510, a polarizer 513 stuck to a bottom surface of the lower substrate 511, a light-source 528 for a back light and a light-guide plate 527 for leading the light from the light source 528 into the liquid-crystal 520.

The non-linear resistive element 521 sandwiched between a pixel electrode and a signal electrode is in contact with the signal electrode. The lower substrate 511 has a scanning electrode through which it is in contact with the liquid-crystal 520.

The above-mentioned device construction is the same as that of a two-terminal matrix type LCD panel which is represented by a MIM (metal-insulator-metal) diode excepting the former adopting non-linear resistive elements having light-sensitivity.

The optical writing operation of the device is as follows:

The liquid crystal is put into a transparent state and a desired voltage is applied across the pixel electrode and the scanning electrode, then an original 526 is illuminated. Light reflected from the original 526 falls on non-linear resistive elements 521b, those of which received light reflected from white portions 526b of the original 526 reduce its resistance, causing reduction of an effective voltage applied to the liquid crystal molecules which in this case are aligned parallel to the substrates. As light is absorbed by black parts 526a of the original 526, no light falls on corresponding non-linear resistive elements 521a which have no change in its resistance and therefore keep the liquid crystals as be aligned perpendicular to the substrates. Thus, an image of the original is written directly into the liquid crystal by light.

The electrical image-reading method is as follows: The non-linear resistive elements are classified into resistive components and capacitive components, which are connected in parallel to each other. The liquid crystals are also classified into resistive components and capacitive components, which are connected in parallel to each other. The non-linear resistive elements are connected in series to the liquid crystals. When reflected light rays from the original image fall on non-linear resistive elements and liquid crystals, resistive components of the resistive elements and capacitive components of the liquid crystals decrease. With a voltage being applied across the pixel electrodes and scanning electrodes, current flowing illuminated pixels differs in value from current flowing not-illuminated pixels. The written image can be read by detecting differential currents of pixels.

As described above, both the prior art display units provided with an image input facility, which are disclosed in Japanese Laid-open Patent Publications No. 4-282609 (TOKKAI HEI) and No. 6-186585 (TOKKAI HEI), are manufactured each by merely laminating an image sensor on a liquid-crystal display panel. Each device is complicated in structure because of forming a LCD layer (display electrodes) and an image inputting sensor layer (image-inputting electrodes) on different surfaces.

To read an original image and display it on a LCD panel, each device has to convert the optical image into electrical signals through processes of reading the original image by the image sensor, converting electrical signals of the read image into electrical signals for display, displaying the image by electrical signals on the display panel. The device may have errors in the processes resulting in lowering the displayed image quality.

An image displayed on the LCD panel can be restricted in its resolution by either lower one of resolution powers of the image sensor and the LCD panel.

On the other hand, the conventional device with an image input facility, which described in Japanese Laid-open Patent Publication (TOKKAI HEI) No. 4-251824, is constructed on the base of a two-terminal element matrix type LCD panel. This can not be adapted to a TFT-type LCD panel or a simple matrix type LCD panel.

Non-linear resistive elements used for displaying and inputting an original image can not transmit light, so an increase of an area of these elements may darken the display image whilst a decrease of an area of the elements decreases a light-receiving surface area, causing a problem not to obtain large signals of high signal-to-noise ratio.

The device can optically write an original image into the LCD panel to directly display the image thereon. The resolution of the displayed image is, however, restricted by the density of the non-linear resistive elements. Namely, it is limited to the resolution of the LCD panel.

The discrete arrangement of the small-surface non-linear resistive elements may cause a decreased density of input image sampling resulting in increasing an error of th e image signal.

Referring now to the accompanying drawings, integrated image-input type display units which are preferred embodiments of the present invention will be described below in detail.

Figure 2:
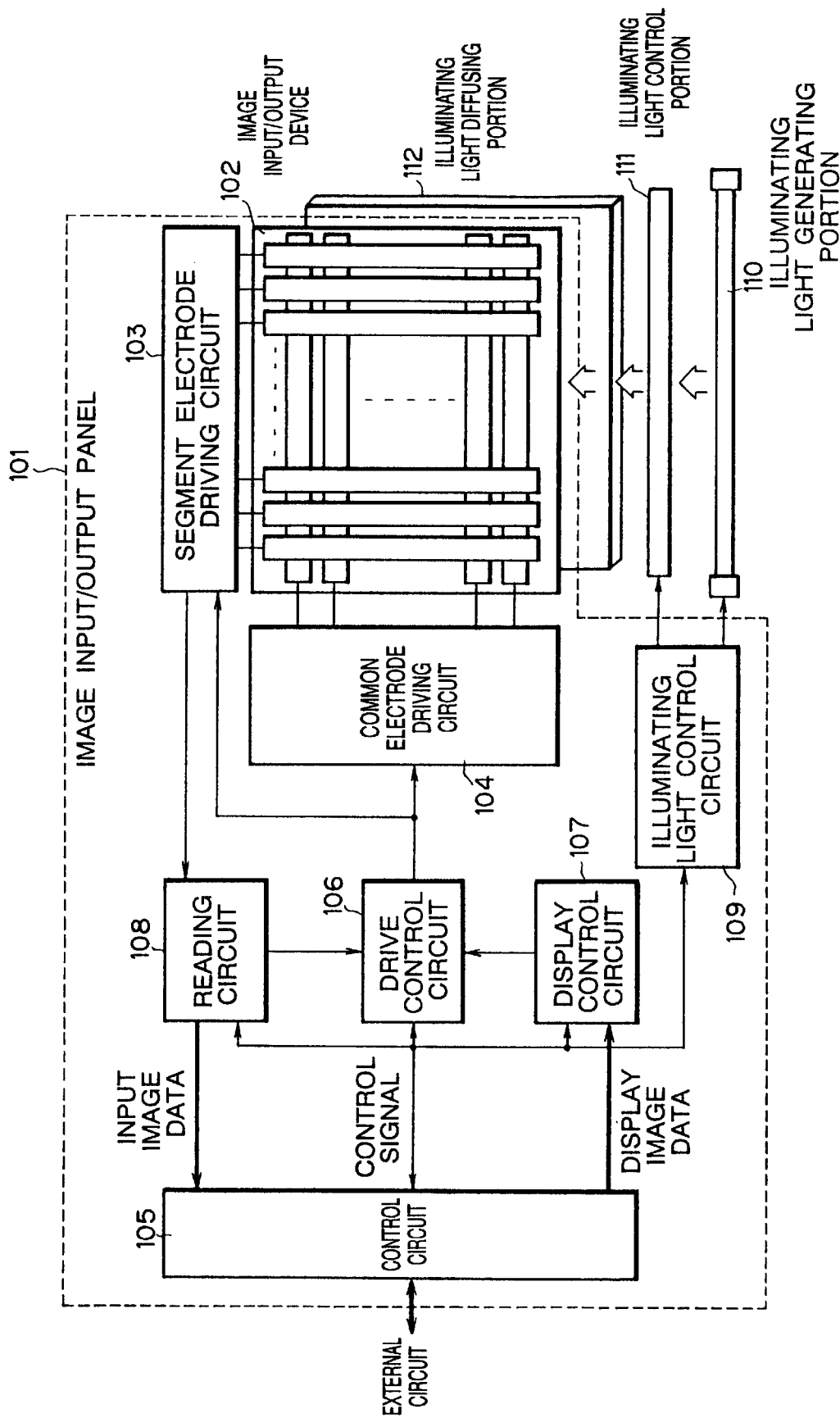
FIG. 2 is a construction view of a system of an integrated image-input type display unit.

Referring to FIG. 2, a construction of an embodiment system for realizing the present invention is first described as follows:

The system is composed mainly of following two basic units—an image input/output panel 101 and illuminating portion comprising an illuminating light generating portion 110, an illuminating light control portion 111 and an illuminating light diffusing portion 112.

The image input/output panel 101 is divided into a device portion composed of an image input/output device 102, a segment electrode driving circuit 103 and a common electrode driving circuit 104; a reading portion composed of a reading circuit 108; and a system control portion composed of a control circuit 105, a drive control circuit 106, a display control circuit 107 and an illuminating light control circuit 109.

The above-mentioned classification is only applied for explaining embodiments of the present invention and can not always be applied strictly to practical implementations which may have a variety of partial modifications.

The system control portion controls the operation of a whole system of an integrated image-input type display unit shown in FIG. 2.

The control circuit 105 receives signals from the external circuit or the drive control circuit 106, the display control circuit 107, an illuminating light control circuit 109 and reading circuit 108 and gives respective control signals to respective circuits in order to realize an object operation of a whole system by coordinating and controlling the activities of all other blocks.

The display control circuit 107 is used for controlling the display operation of the image input/output device 102 and performs the display data control in a mode designated by the control circuit 105, to hold display data from the external circuit, image data read from the reading circuit 108 or image data read in the image input/output panel 101.

The drive control circuit 106 gives necessary control signals and display information to the segment electrode driving circuit 103 and the common electrode driving circuit 104 according to a control signal from the control circuit 105 to display an image on the image input/output device 102, write an original image information into the image input/ output device 102 or read-out the written image information from the image input/output device 102.

Similarly, the illuminating light control circuit 109 gives necessary control signals to the illuminating light generating portion 110 and illuminating light control portion 111 according to a control signal from the control circuit 105 to display an image on the image input/output device 102, write an original image information into the image input/output device 102 or read-out the written image information from the image input/output device 102.

The device portion of the display unit is described below. This portion performs image input-output operations.

The image input/output portion 102 is composed of liquid-crystal cells containing therein liquid crystal molecules and light-sensitive molecules capable of changing their molecular structure by the effect of illumination of specified wavelengths.

An image based on displaying data supplied by the display control circuit 107 through the drive control circuit 106 is displayed, in the same way as in the conventional liquid-crystal panel, with light supplied from the illuminating light diffusing portion 112 in accordance with driving signals from the segment electrode driving circuit 103 and the common electrode driving circuit 104.

On the other hand, a desired image information from an original can also be written into the image input/output device 102 in terms of a change in structural state of light-sensitive molecules by the effect of light supplied by the illuminating light diffusing portion 112 through the original according to driving signals from the segment electrode driving circuit 103 and the common electrode driving circuit 104.

The segment electrode driving circuit 103 and the common electrode driving circuit 104 are based on conventional driving circuits for a duty type liquid crystal panel and prepared with some necessary modifications made thereto. In designing the image input/output device 102 on the basis of the construction of a TFT liquid crystal panel, it is also possible to design the segment electrode driving circuit 103 and the common electrode driving circuit 104 on the basis of a source electrode driving circuit and a gate electrode driving circuit.

The illuminating portion is described as follows:

This portion is intended to supply the image input/output device 102 with light that is used as back light for displaying an image on the image input/output device 102 and is used as light for illuminating an original when writing an original image into the image input/output device 102.

The illuminating light generating portion 110 generates light of specified wavelengths necessary for displaying an image on the image input/output device 102 and light of specified wavelengths necessary for writing an original image into the image input/output device 102. The illuminating light control portion 111 cuts off unnecessary light or prevents light from leaking into unnecessary blocks and other necessary operations on light emitted from the illuminating light generating portion 110 according to a specified operation mode. The illuminating light generating portion 110 and the illuminating light control portion 111 may have a variety of construction in combination with each other as described later in preferred embodiments of the present invention.

The illuminating light diffusing portion 112 is intended to evenly illuminate a whole surface of the image input/output device 102 by diffusing light from the illuminating light generating portion 110 through the illuminating light control portion 111.

The reading portion is described as follows:

This portion is composed of the reading circuit 108 which control signal effecting on the segment electrode driving circuit 103 and common electrode driving circuit 104 through the control circuit 105 and the drive control circuit 106 in such a way that an image information written in terms of a change in state of the light-sensitive molecules in the image input/output device 102 is read out in terms of electric signals obtained by conversion of detected differential capacities representing the variation of alignment of liquid crystal molecules, which was caused by the change in the state of the light-sensitive molecules.

Figure 3B:
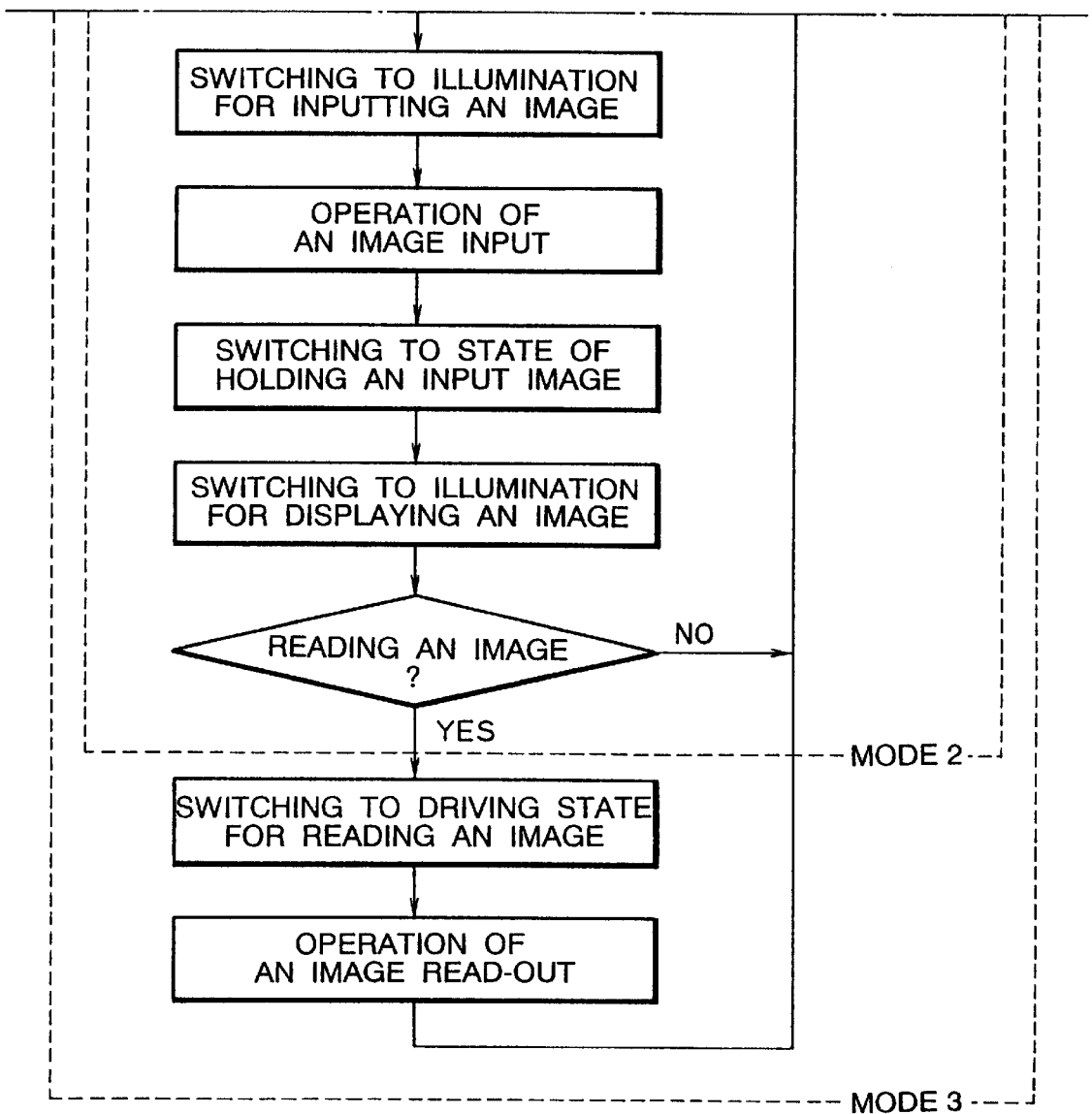

Referring to FIGS. 2 (system construction) and 4 (flowchart), operation modes of the system are described as follows:

The system works in any one of three following modes:

In FIGS. 3A and 3B, the flowchart describes the sequential control operation of the system, wherein respective modes are indicated by dividing the chart by dotted lines. The flowchart of the operation of the system in each operation mode may be described on the basis of the shown flowchart.

The operation mode 1 is the mode in which the system displays information, e.g., data supplied from the external circuit on the image input/output device 102 in the same way in the conventional liquid crystal panel.

The operation of the system in the mode 1 is described according to the flow chart of FIGS. 3A and 3B.

By switching ON an electric power supply of the system, a display content selecting routine is called for judging which one of images is displayed, an image based on the image data supplied from the external circuit, an image based on image data read by the reading circuit 108 or an image based on image data written from an original into the image input/output device 102 (with no modification). A control signal based on the judgment made by the routine is given from the control circuit 105 (FIG. 2) to the display control circuit 107, the drive control circuit 106 and illuminating light control circuit 109.

The display control circuit 107 receives display image data together with the control signal from the control circuit 105 and supplies the data to the drive control circuit 106 in due timing suitable for displaying a new image on the image input/output device 102. The drive control circuit 106 gives drive control signals and display image data to the segment electrode driving circuit 103 and the common electrode driving circuit 104 to display the image on the image input/output device 102.

On the other hand, the illuminating light control circuit 109 is instructed to supply light for illuminating the image input/output device 102. In the mode 1, the illuminating light control circuit 109 controls the illuminating light generating portion 110 and the illuminating light control portion 111 to supply light as back light through the illuminating light diffusing portion 112.

After displaying the image by a frame or several frames, it is determined whether or not image input is performed. If not, the selection of a display content is made and then the display operation is performed. If an image is input, the system operates in mode 2. In this operation mode, an image information of an original is read in the image input/output device 102 to be followed by the same display operation as made in mode 1.

The following operation steps will be performed in mode 2 if it was judged in mode 1 that an image input is required.

In this case, the control circuit 105 gives a control signal by which image information of an original placed on the specified place of the image input/output device 102 is optically written therein.

Following the operation in mode 1, the control circuit 105 gives a control signal to initialize the display by using the segment electrode driving circuit 103 and the common electrode driving circuit 104 through drive control circuit 106. By doing this, the image input/output device 102 is set in its initial state allowing further image inputting operation.

After this, the segment electrode driving circuit 103 and the common electrode driving circuit 104 are ready to conduct the image input operation by the drive control circuit 106 and, in addition, the illuminating light control circuit 109 under the control of the control circuit 105 controls the illuminating light diffusing portion 112 to supply light of a specified wavelength necessary for writing an image into the image input/output device 102. Thus, the necessary light transmits the original and enters into the image input/output device 102.

By the effect of the above-mentioned control, the original image information is written in terms of variation of state of the light-sensitive molecules in the image input/output device after the elapse of a specified time and then the segment electrode driving circuit 103 and the common electrode driving circuit 104 turned into a state to hold the written image information. The illuminating light generating portion 110 and illuminating light control portion 111 are turned by the illuminating light control circuit 109 to a state for image display. The image input operation in the mode 2 is now completed.

The mode 3 is applied if it was judged in mode 2 that reading the image written in the image input/output device is requested. In this case, steps including a step following the image input operation are performed. According to the instruction given by the control circuit 105, the image written in the image input/output device 102 is read in terms of electric signals by the reading circuit 108.

By the effect of a control signal from the control circuit 105, the reading circuit 108 gives necessary control signal to the drive control circuit 106 which in turn through segment driving circuit 103 and the common electrode driving circuit 104 reads by scanning the image in the image input/output device 102.

Scanned signals from the image input/output device 102 through the segment driving circuit 103 and the common electrode driving circuit 104 are output to the reading circuit 108. The processed signals from the reading circuit transfer to the control circuit 105 which in turn outputs the signals to the external circuit and supplies the signals as display information to the display control circuit 107. Thus, the image written in the image input/output device 102 is read out therefrom and displayed thereon.

The processing made on the scanned signals by the reading circuit 108 will be described later in detail with an example of the reading circuit 108.

The whole system of the embodiment, the summary of its operation and the activities of system control portion have been described above. The illuminating portion, the device portion and the reading portion of the system will be described below in detail in regard with their implementations.

Figure 4A:
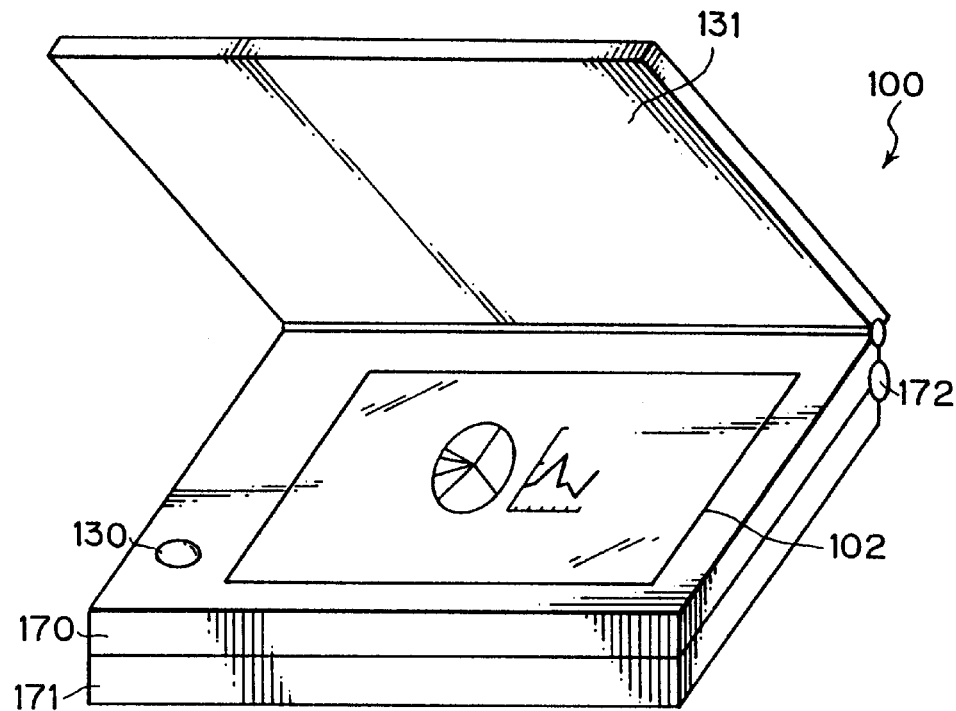
FIG. 4A is an external view of an integrated image-input type display unit working in displaying and reading an image.
Figure 4B:
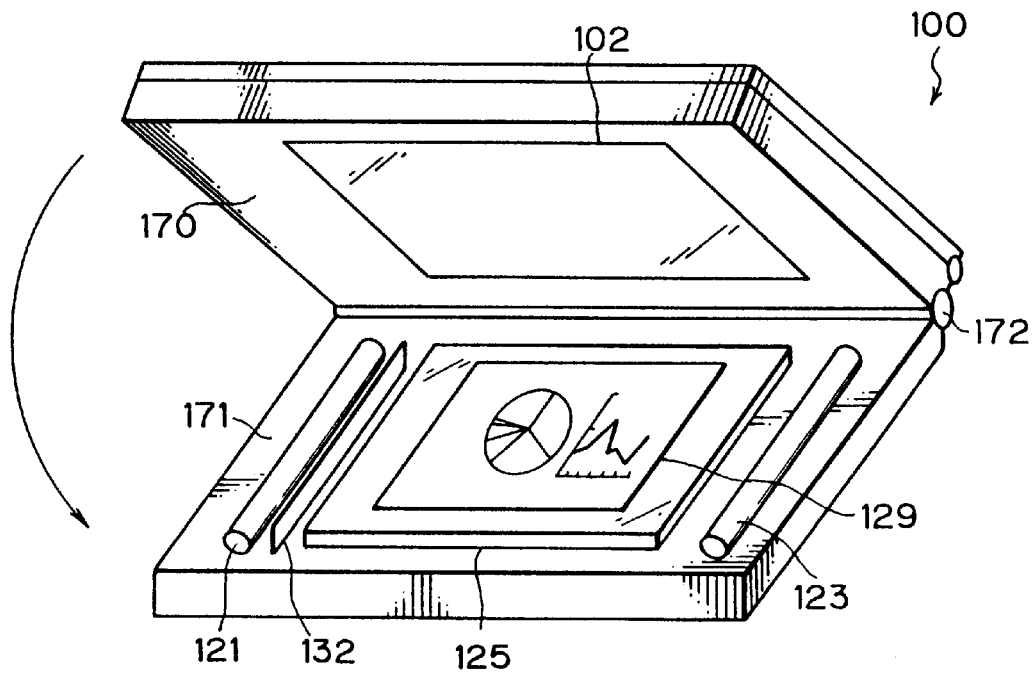
FIG. 4B is an external view of an integrated image-input type display unit when placing thereon an original to be read.

FIGS. 4A and 4B show an external appearance of an integrated image-input type display unit, when displaying and reading image in FIG. 4A, when inserting an original to be read in FIG. 4B respectively.

A body 100 is composed mainly of an upper half 170 and a lower half 171. The upper half 170 is provided with an image input/output portion 102, switch 130 (FIG. 4A) and a flapper cover 131 (FIG. 4A). The lower half 171 is provided with a first lamp 121 (FIG. 4B) for emitting visible light, a second lamp 123 (FIG. 4B) for emitting ultraviolet light, a diffuser plate 125 (FIG. 4B) and a filter 132 (FIG. 4B). The upper half 170 and the lower half 171 of the body 100 can be turned open and close (laid on each other) about the connector portion 172.

The image input/output device 102 is a liquid crystal display. Three kinds of light for illuminating the image input/output device 102 through the diffuser plate 125 (FIG. 4B) can be generated by using the first lamp 121 (FIG. 4B), the second lamp 123 (FIG. 4B) and the filter 132 (FIG. 4B) as described later in detail. The first light is white light having visible range wavelength, which contains light of a specified wavelength $\lambda 1$. The second light is ultraviolet light having an ultraviolet range wavelength, which contains light of another specified wavelength $\lambda 2$. The filter 132 (FIG. 4B) is divided into two light-passing portions (not shown) (a) for transmitting the first light and (b) for absorbing only light of wavelength $\lambda 1$. When the first lamp 121 (FIG. 4B) lights, either one of two light-passing portions (a) and (b) is selected to use and inserted between the first lamp 121 and the diffuser plate 125 (FIG. 4B). While the light-passing portion (a) of the filter 132 (FIG. 4B) is used, the first light enters the diffuser plate 125 (FIG. 4B). While the light-passing portion (b) is used, the third light, which is obtained by eliminating light of wavelength $\lambda 1$ from the first light, enters the diffuser plate 125 (FIG. 4B). The third light does not cause the change in the state of light-sensitive molecules in the image input/output device since it contains no light of wavelengths $\lambda 1$ and $\lambda 2$ to which said molecules react.

This display unit can be used as a simple display device when the selector switch 130 (FIG. 4A) is set in Display Mode. In this case, light from the diffuser plate 125 (FIG. 4B) is controlled to be the first light. The image input/output device 102 is supplied with a display signal and displays thereon an image as shown in FIG. 4A. The first light serves as back light, allowing a user to see the image on the display screen of the image input/output device 102.

An image is input to the image input/output device 102 in the following manner:

As shown in FIG. 4B, the upper half 170 is swung up to expose the diffuser plate 125. An original 129 desired to be read is placed at an adequate position on the diffuser plate 125 and then the upper half 170 is swung down to close as seen in FIG. 4A. The selector switch 130 (FIG. 4A) is set in Input Mode to start the image inputting operation. In this instance, light from the diffuser plate 125 is controlled to be the second light by which the original image is input to the image input/output device 102. Upon completion of the image input operation, the light is switched over to the third light by which the input image is displayed on the display screen of the image input/output device 102. The original 129 can be removed from the display unit if no need be.

With the selector switch set in Read Mode, the image written into the image input/output device 102 can be read therefrom in form of electric signals.

The above-mentioned display unit may be used for wide field of application by building a variety of functions therein. For example, it may be used as a personal computer (PC) which is capable of inputting a variety of data from paper documents, putting titles or keywords to respective data by using a keyboard or a mouse connected to the display unit and storing the input data into a memory or other storing medium. Each of such stored data can be quickly called to the display unit by searching a keyword. Furthermore, any input image can be converted immediately into coded information suitable for further edition by using a character recognizing technique and an image recognizing technique for the personal computer. The coded character and image information can be edited by using a word processing software and a computer-aided designing software. The display unit provided with a radio or wire communication facility can transmit and receive an input image to and from another terminal. The display unit may be used as a facsimile using a public telecommunication network. For this purpose, a modem may be attached to or built in the display unit. The use of this embodiment with a variety of functions is effective to create a pocket computer or portable information terminal. The unit may serve as an effective information tool for personal use. The above-mentioned multi-functional display units are shown by way of examples and do not restrict the scope of multi-functioning of the unit.

Figure 5:
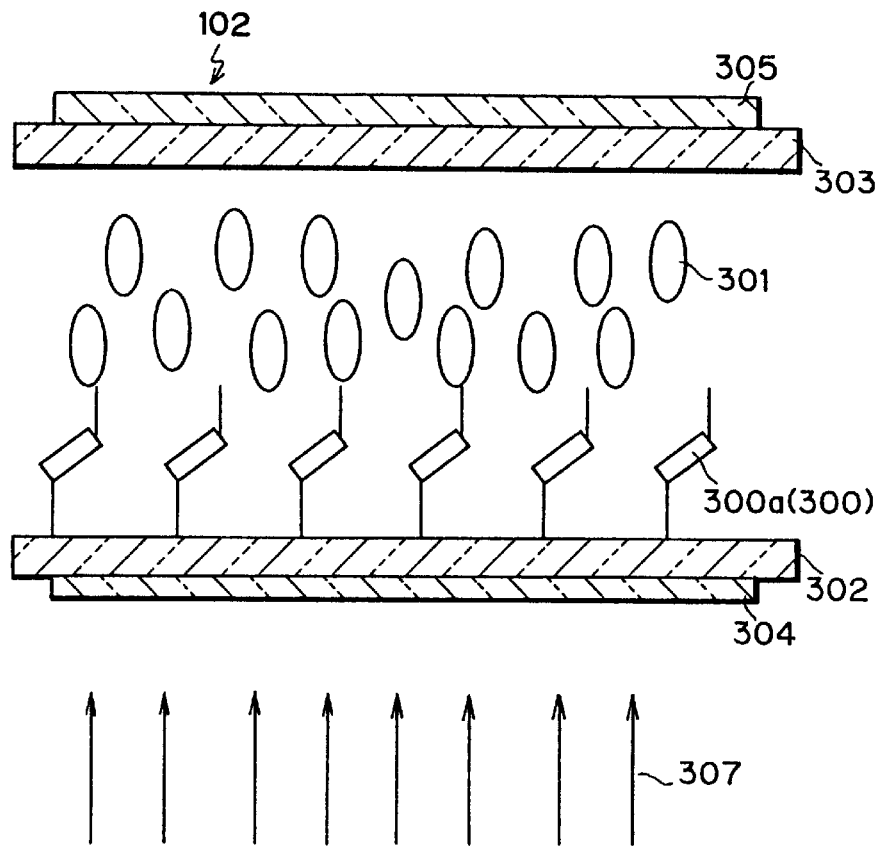
FIG. 5 is a sectional view of an image input/output device of a first embodiment of the present invention.

The device portion is described in detail as follows:

FIG. 5 is a sectional view of the image input/output device 102 of the first embodiment of the present invention.

The image input/output device 102 is composed of liquid crystal cells each containing light-sensitive molecules 300 and liquid-crystal molecules 301 hermetically held between two transparent substrates 302 and 303. This device is basically similar in construction to a duty type liquid crystal panel.

The transparent substrates 302 and 303 are usually made of transparent plate glass, which are used for hermetically holding liquid-crystal molecules 301. Accordingly, they may also be made of transparent plastic, transparent ceramics or transparent synthetic rubber. These substrates may be not only plates but also be flexible films. Polarizers 304 and 305 made of transparent film are stuck on the substrates 302 and 303 respectively. The polarizers 304 and 305 are used for converting input light into linearly polarized light and arranged with their crystal axes being substantially normal to each other.

Light-sensitive molecules 300 form a thin layer attached to a surface of the transparent substrate 302, which may function as an orientation film for controlling the orientation direction of liquid crystal molecules 301. The light-sensitive molecules 300 are photochromic molecules capable of reversibly changing molecular structure when exposed to light of specified wavelengths (e.g., stilbene, azobenzene derivative and so on).

A method of manufacturing the image input/output device 102 is shortly described. It is basically the same as a method of manufacturing a liquid crystal panel. A thin film containing the light-sensitive molecules 300 is formed by chemical adsorption or application or LB-film adhesion on the substrate 302 with a driving transparent electrode formed thereon. The transparent substrate 302 with the thin film of the light-sensitive molecules 300 formed thereon and the transparent substrate 303 with a transparent electrode formed thereon are opposed to each other through a spacer and hermetized at the periphery with hermetic material. Liquid crystal is pored into the space between the transparent substrates through an open port that is then sealed with hermetic material.

Figure 6A:
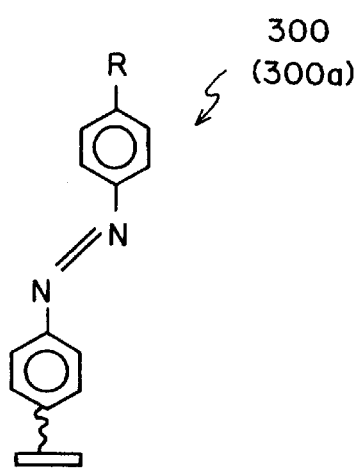
FIG. 6A is a mimic view showing a state of light-sensitive molecules used in the image input/output device shown in FIG. 5.
Figure 6B:
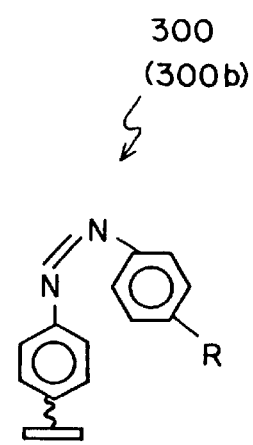
FIG. 6B is a mimic view showing another state of light-sensitive molecules used in the image input/output device shown in FIG. 5.

The function of the light-sensitive molecules 300 is mimically shown in FIGS. 6A and 6B. The light-sensitive molecules 300 change their molecular structure into linear trans-form 300a (FIG. 6A) when exposed to light of a specified wavelength $\lambda 1$ and change their molecular structure into V-shaped cis-form 300b (FIG. 6B) when exposed to light of a specified waveform $\lambda 2$. These reactions are reversible and repeatable. Namely, the light-sensitive molecules 300 undergo change of their molecular structure when exposed to light of specified wavelengths $\lambda 1$ and $\lambda 2$. The molecules 300 maintain the changed structure until they are exposed to light of different specified wavelength $\lambda 1$ or $\lambda 2$. In short, the trans-form molecules remain unchanged until they are exposed to light of the wavelength $\lambda 2$ and the cis-form molecules remain unchanged until they are exposed to light of the wavelength $\lambda 1$.

Figure 8A:
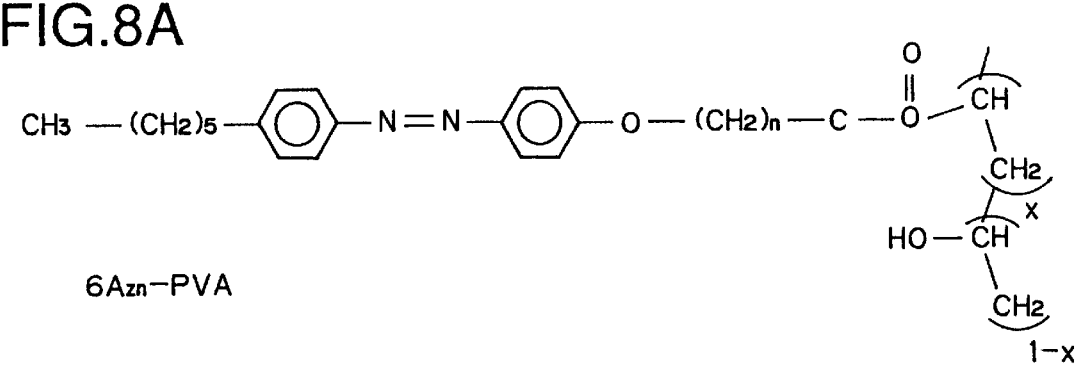
FIG. 8A shows a molecular structure of light-sensitive molecules.
Figure 8B:
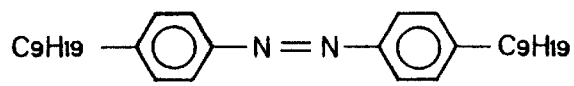
FIG. 8B shows another molecular structure of light-sensitive molecules.

The molecular structures of compounds usable as the light-sensitive molecules 300 are shown by way of example in FIGS. 8A and 8B. In FIG. 8A, there is shown a molecular structure of a compound of polyvinyl alcohole (PVA) with azobenzene. This molecular compound changes its form from trans-form into cis-form when exposed to ultraviolet light of 363 nm ($\lambda 2$). The compound alters its form from cis-form into trans-form when exposed to visible light of 436 nm ($\lambda 1$). FIG. 8B shows the molecular structure of a 4,4'-dinonylazobenzene that changes from trans-form into cis-form when exposed to ultraviolet light ($\lambda 2$) and from cis-form into trans-form when exposed to visible light ($\lambda 1$). The light-sensitive compound 300 containing the above-mentioned photochromic molecules substantially changes the molecular structure from cis-form into trans-form when exposed to visible light having a specified wavelength and from trans-form into cis-form when exposed to ultraviolet light of a specified wavelength.

The liquid crystal molecules 301 are liquid crystal molecules usually used for displays, for example, twisted nematic (TN) liquid crystal or super-twist nematic liquid crystal. ON-OFF control of transmission of light is realized by changing the alignment of the liquid crystal molecules in the image input/output device by the effect of two polarizers 304 and 305.

The effect of the light-sensitive molecules 300 on the liquid crystal molecules 301 is described as follows:

As shown in FIG. 5, the light-sensitive molecules 300 takes the linear trans-form (300a) while the image input/output device 102 is illuminated by visible light 307 containing light of a wavelength ($\lambda 1$) (the first light). The light-sensitive molecules 300 acts as an aligning film of the liquid crystal molecules 301. Consequently, the liquid crystal molecules 301 under the influence of the light-sensitive molecules 300 have homeotropic alignment in the direction perpendicular to the transparent substrates 302 and 303.

Figure 7:
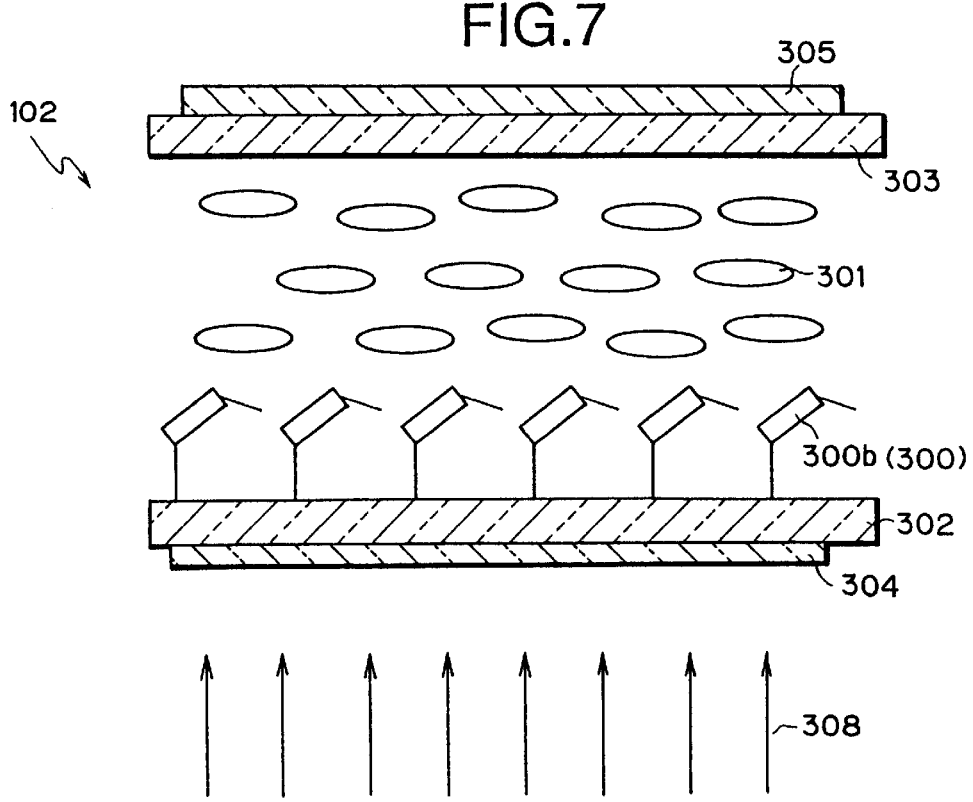
FIG. 7 is a view for explaining the operation of the image input/output device shown in FIG. 5.

On the other hand, as shown in FIG. 7, the light-sensitive molecules 300 takes the V-shape cis-form (300b) while the image input/output device 102 is illuminated by ultraviolet light 308 containing light of a wavelength ($\lambda 2$) (the second light). The liquid crystal molecules 301 under the influence of the molecule-shape of the light-sensitive molecules 300 have planer orientation in the direction parallel to the transparent substrates 302 and 303. The control of transmission light by aligning the liquid crystal molecules is the same as in the usual liquid crystal display. The light transmits when the liquid crystal molecules are in homeotropic alignment whilst light is shut off when the liquid crystal molecules are in planer alignment. The above-mentioned change may occur with no voltage applied on the liquid crystal molecules 301. However, it is possible to apply a voltage lower than a threshold value to the liquid crystal molecules to increase a response characteristic.

The light-sensitive molecules 300 takes either one of cis-form and trans-form. However, the change in form of the light-sensitive molecules occurs at a probability. Accordingly, the number of changeable molecules 300 depend on an intensity of visible or ultraviolet light. Namely, an input image may be written with gradation as the intensity of the incident light.

Although the described embodiment uses a combination of visible light (as the first light) and ultraviolet light (as the second light), it may adopt another combination, e.g., of visible light (as the first light) and infrared light (as the second light) with no change in the essence of the invention.

The light-sensitive molecules 300 are much smaller than the segment electrode and the common electrode. A vast number of the light-sensitive molecules 300 (beyond the comparison with that of electrodes) are formed in the transparent substrate 302, so an optically written image can have a greater resolution than that of an electrically written image.

Referring to FIGS. 9A, 9B, 9C and 9D, the actions of writing an optical image (in Image-Input Mode), electrically reading a written image and electrically writing an image in the image input/output device 102 is described below:

The image input/output device 102 shown in FIGS. 9A, 9B, 9C and 9D differ in construction from that of FIG. 5 by adding segment electrodes 310 and a common electrode 311 for realizing electrical writing and reading functions. Polarizers 304 and 305 are not shown in FIGS. 9A, 9B, 9C and 9D. In this case, three kinds of light are applied: The first light is visible light 307 (FIG. 9A) containing light of a wavelength $\lambda 1$ causing the light-sensitive molecules 300 to change their molecular structure from cis-form into trans-form. The first light is desired to contain all wavelength components since it is commonly used as back light for the display. It does not contain light of wavelength $\lambda 2$. The second light is ultraviolet light 308 (FIG. 9B) containing light of wavelength $\lambda 2$ which can cause the light-sensitive molecules 300 to change their molecular structure from the trans-form into the cis-form. It does not contain light of wavelength $\lambda 1$. The third light is visible light (not shown) which does not contain light of wavelength $\lambda 1$. It does not contain, of course, light of wavelength $\lambda 2$.

The Image-input Mode operation is described first as follows:

A liquid crystal cell is set into an initialized state (FIG. 9A) in which its whole surface is transparent with the homeotropically aligned liquid-crystal molecules uniformly arranged therein. Visible light 307 is applied from one side to a whole surface of the liquid crystal cell to cause the light-sensitive molecules to change into trans-form. The incident light may enter the crystal cell from any side but preferably in view of effectiveness from the transparent substrate 302 whereon light-sensitive molecules 300 are formed. Since most of the light-sensitive molecules 300 change into trans-form 300a, the liquid crystal molecules 301 are aligned homeotropically, bringing the liquid cell into transparent state. In this case, no voltage is applied across the segment electrodes 310 and the common electrode 311.

Figure 9A:
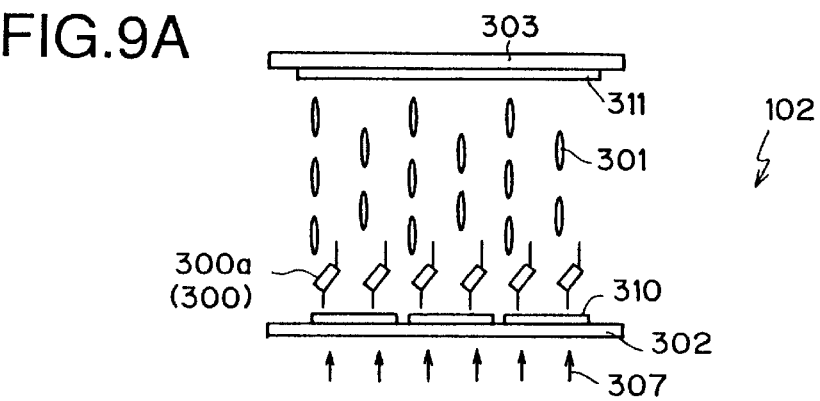
FIG. 9A is a view for explaining an operation of the image input/output device shown in FIG. 5.
Figure 9B:
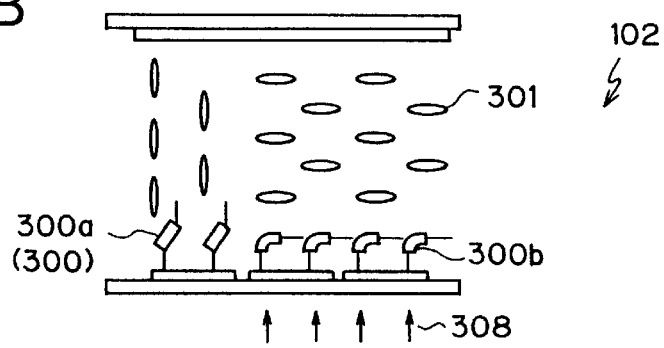
FIG. 9B is a view for explaining another operation of the image input/output device shown in FIG. 5.

According to an illumination method shown in FIGS. 4A and 4B using ultraviolet light, a transmitted ultraviolet-light image of an original is projected to the image input/output device (FIG. 9B). Ultraviolet light transmitted through white portion of the original enters into the image input/output device 102. Light-sensitive molecules exposed to ultraviolet rays 308 change their structure from trans-form 300a into cisform 300b. Accordingly, liquid crystal molecules 301 in the neighborhood of the cis-form light-sensitive molecules are planarly aligned. Light-sensitive molecules not exposed to ultraviolet rays are left as be of trans-form 300a and, therefore, liquid crystal molecules in the neighborhood of these light-sensitive molecules remain homeotropically aligned. Namely, areas exposed to the second light 308 become opaque while areas not exposed to the second light remain transparent. Namely, an inverse image of the original is written into the image input/output device 102. In this case, no voltage is applied across the segment electrodes 310 and the common electrode 311. The written image can be held unless light of wavelengths $\lambda 1$ and $\lambda 2$ is entered into the image input/output device 102 or a voltage higher than a threshold value is applied across the segment electrodes 310 and the common electrode 311.

An image optically written into the image input/output device 102 can be displayed thereon by using the third light as back light. The third light can not erase the written image since it does not is., change the form of the light-sensitive molecules. The optically written image has a high resolution as mentioned before. Therefore, it can be displayed at a high resolution independent of the sizes of segment and common electrode.

Figure 9C:
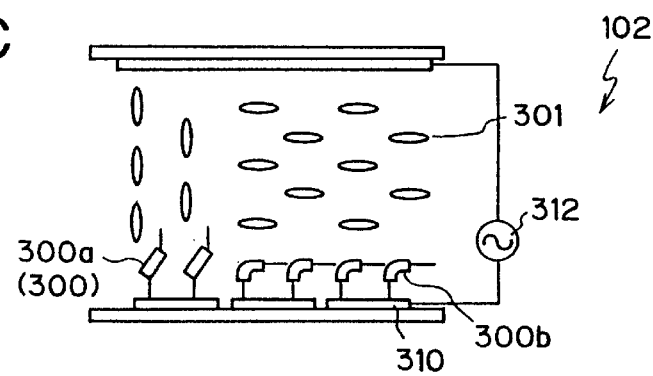
FIG. 9C is a view for explaining another operation of the image input/output device shown in FIG. 5.

Referring to FIG. 9C, the operation of the image input/output device 102 is described now in Image-reading Mode for electrically reading an image written in the image input/output device 102.

The liquid-crystal molecules possess dielectric anisotropy. In other words, a change in alignment of the liquid-crystal molecules causes a dielectric constant across the segment electrodes 310 and common electrode 311. This means that alignment of the liquid-crystal molecules can be determined by detecting a dielectric constant for each pixel. When the written image is held in the image input/output device 102, a voltage is applied across the segment electrodes 310 and the common electrode 311 to detect the alignment of the liquid-crystal molecules. The applied voltage is lower than the threshold value at which the alignment of the liquid crystals can not be changed. This voltage may be a direct-current voltage or alternating-current voltage. Thus, the optically written image can be read out by converting it into electric signals.

Figure 9D:
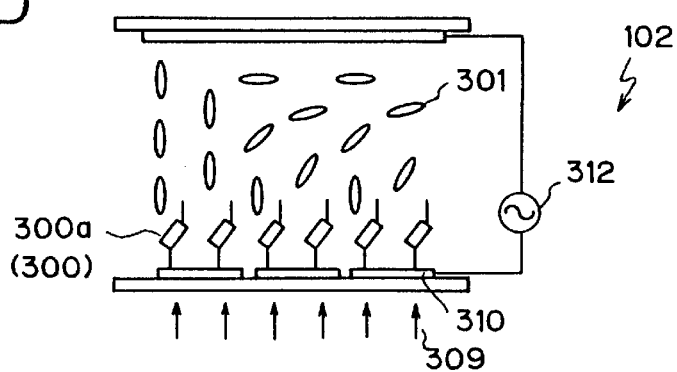
FIG. 9D is a view for explaining another operation of the image input/output device shown in FIG. 5.

Referring to FIG. 9D, the operation of the image input/output device 102 is described in Display Mode for inputting an electric signal therein and displaying corresponding input image thereon (by a method of usual use of a liquid-crystal panel).

In the Display Mode, a whole surface of the liquid crystal cell (panel) is always illuminated with visible light 309 as back light. The visible light 309 contains light of wavelength $\lambda 1$ and therefore causes the light-sensitive molecules 300 to change their structure into trans-form 300a. Namely, the panel is initialized with all liquid-crystal molecules being homeotropically aligned. In this state, each pixel is given an electric signal. When a voltage higher than a threshold is applied a pixel, homeotropical alignment of liquid crystal molecules of the pixel is altered into planar alignment. Thus, the image input/output device 102 works in the same way as the conventional liquid crystal panel. The visible light 307 and the back light (for display) does not necessarily have the same wavelength components in principle. However, the visible light 309 can be used in common as back light. This makes the panel be much simple. There is no need for use a separate back light of different wavelengths. The shown embodiment uses twisted nematic liquid-crystals or suppertwisted nematic liquid-crystals as liquid crystal display panel which can, therefore, be driven at a low voltage.

Figure 10:
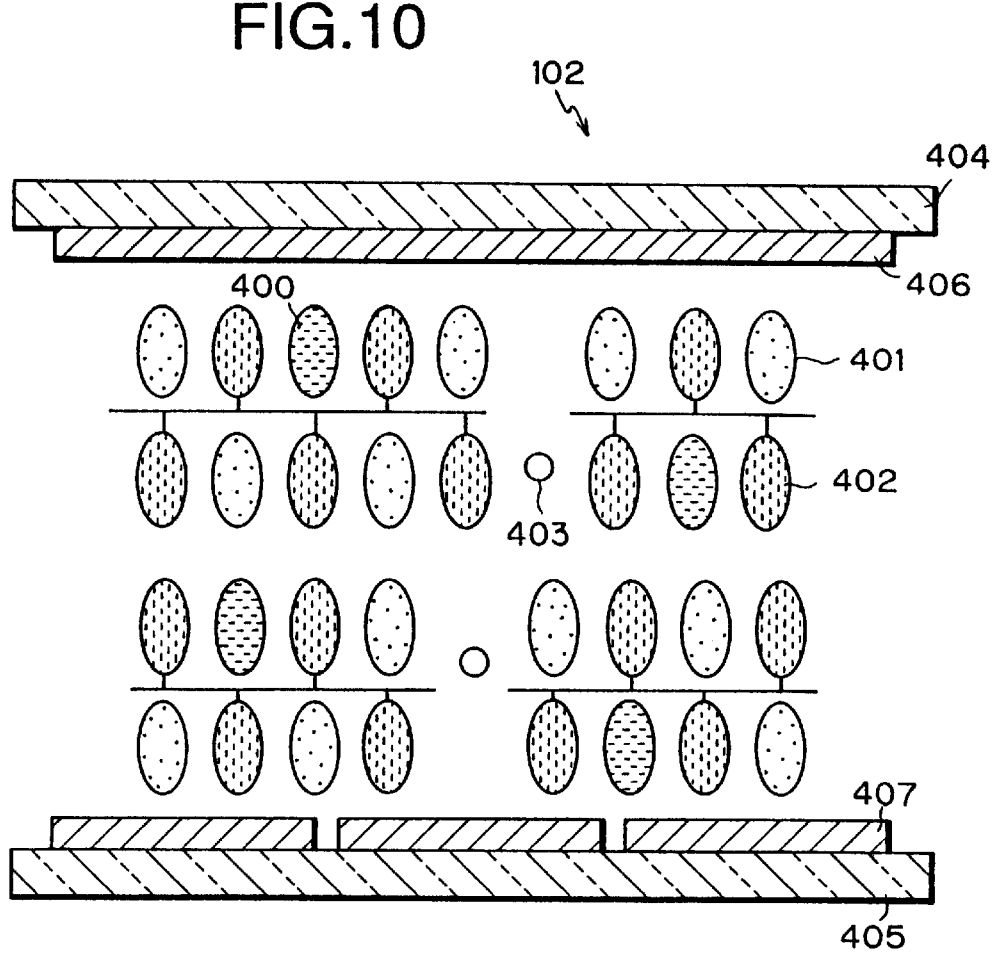
FIG. 10 is a sectional view of an input/output device which is a second embodiment of the present invention.

FIG. 10 shows sectional view of image input/output device 102 of a second embodiment of the present invention.

The image input/output device 102 comprises light-sensitive molecules 400, low-molecular liquid crystals 401, high-molecular liquid crystals 402, ions 403, a transparent substrate 404, a transparent substrate 405, a common electrode 406 and segment electrodes 407. The transparent substrates 304 and 405 hermetically hold therein the light-sensitive molecules 400, the low-molecular liquid crystals 401 and high-molecular liquid crystals 402.

The light-sensitive molecules 400 together with the low-molecular liquid crystals 401 and high-molecular liquid crystals 402 compose a complex. The light-sensitive molecules 400 controls transmission and diffusion of light in the complex. The light-sensitive molecules 400 contain photochromic molecules that can be photoisomerized at a certain temperature in electric field of a certain frequency. The embodiment uses, as light-sensitive molecules 400, azo-compounds that can reversibly change its structure from trans-form into cis-form when exposed to ultraviolet light and from cis-form into trans-form when exposed to visible light.

Figure 11A:
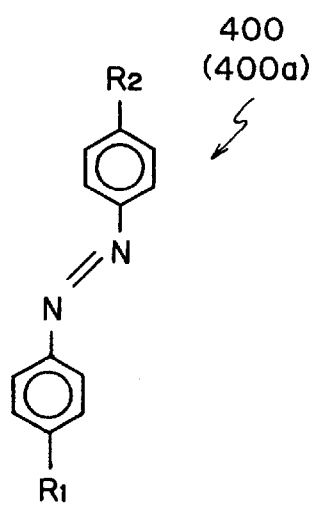
FIG. 11A is a mimic view showing a state of light-sensitive molecules used in the image input/output device shown in FIG. 10.
Figure 11B:
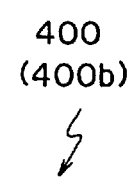
FIG. 11B is a mimic view showing another state of light-sensitive molecules used in the image input/output device shown in FIG. 10.

FIG. 11 mimically shows how the light-sensitive compound 400 functions. This compound 400 alters its molecular structure into a linear trans-form 400*a* when exposed to visible light of wavelength λ1. It further changes the molecular structure into a V-shape cis-form 400*b* when exposed to ultraviolet light of wavelength λ2. These reactions are reversible and repeatable.

An exemplified molecular structure of a light-sensitive compound 400 that is 4,4'-dinonylazobenzene that undergoes a reversible change in molecular structure from the trans-form into the cis-form by ultraviolet radiation and from the cis-form into the trans-form by visible-light radiation.

The low-molecular liquid crystals 401 and the high-molecular liquid crystals 402 are selected so that the complex they compose together with the light-sensitive compound may possess a high-speed memory switching function by alterring the molecular alignment by the effect of controlled electric field. The lower-molecular liquid-crystal 401 is selected so as to make the complex have an adequate viscosity at which it possesses an improved response at the minimal sacrifice of the memorizing property. The high-molecular liquid-crystal 402 is selected so as to make the complex have a suitable memorizing property at the minimal sacrifice of the response characteristic. They can undergo a reversible change in alignment under the influence of the controlled electric field.

The image input/output device 102 is constructed in such a way that the complex prepared of the light-sensitive molecules 400, the low-molecular liquid-crystal 401 and the high-molecular liquid-crystal 402 are sandwiched between the transparent substrate 404 with the internally mounted common electrode 406 and the transparent substrate 405 with the internally mounted segment electrodes 407.

The operation principle of the image input/output device 102 is as follows:

The complex is composed of the light-sensitive molecules 400, the low-molecular liquid-crystal 401 and the high-molecular liquid-crystal 402 and contains ions 403. These ions travel in the complex when a certain low-frequency electric field at a voltage not lower than a threshold value is applied across the common electrode 406 and the segment electrodes 407. These moving ions disturb molecular alignment of high-molecular liquid-crystals 402, producing a large number of micro-domains (areas) in the complex. Namely, the complex becomes optically very heterogeneous, scattering incident light by a large number of refractivity boundaries of the produced domains.

The ion movement ceases when a frequency of the applied electric field is increased to and over a certain frequency (a first critical frequency fc1), so the electric field is applied to liquid crystal molecules which are homeotropically aligned by their dielectric anisotropy. The complex becomes a large optical domain having a uniform refractive index. It appears transparent.

A second critical frequency fc2 is used when the light-sensitive molecules 400 have the cis-form by the effect of ultraviolet radiation. This frequency fc2 is higher than the first critical frequency fc1. In other words, a higher frequency electric field is required to make the light-sensitive molecules 400 of the cis-form be homeotropically aligned because the cis-formed molecules can easily scatter light.

Figure 12A:
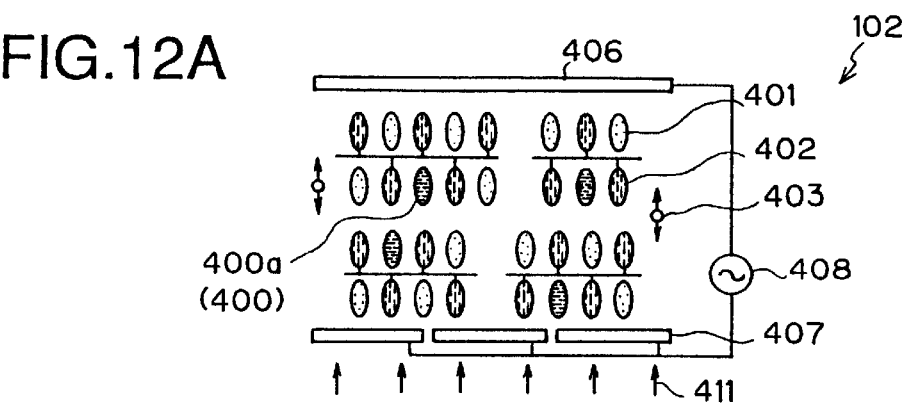
FIG. 12A is a view for explaining an operation of the image input/output device shown in FIG. 10.
Figure 12B:
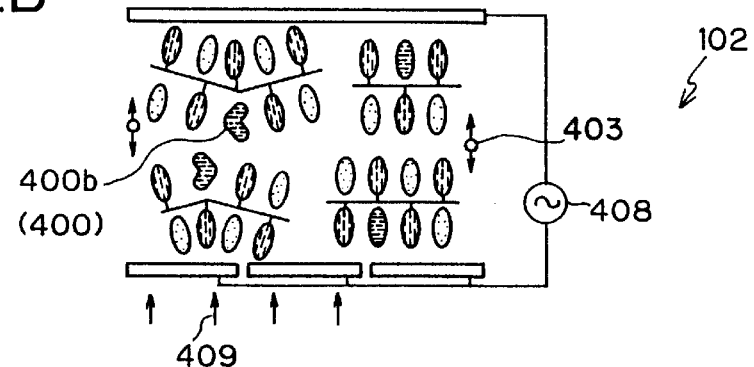
FIG. 12B is a view for explaining another operation of the image input/output device shown in FIG. 10.

Referring to FIG. 12, the operation modes of the image input/output device 102 are explained below:

The Image-input Mode operation is described first as follows:

A complex composed of light-sensitive molecules 400, low-molecular liquid-crystals 401 and high-molecular liquid-crystals 402 is set into an initialized entirely transparent state (FIG. 12A). A high-frequency electric field of a voltage higher than a certain threshold value and a frequency higher than the first critical frequency fc1 is applied from an electric supply source 408 to a circuit between a common electrode 406 and segment electrodes 407. At the same time, visible light 411 containing light of a frequency λ1 is applied from one side to a whole surface of the complex.

The light-sensitive molecules 400 change their form into trans-form 400*a* by light radiation of the frequency λ1. Under the influence of the high-frequency electric field (at a frequency higher than the first critical frequency fc1), the high-molecular liquid-crystals 402 becomes homeotropically aligned to be entirely transparent.

Ultraviolet light 409 containing light of a frequency λ2 transmitted through an original is projected to the image input/output device 102 (FIG. 12B) wherein the transmitted ultraviolet light image is written.

A high-frequency electric field which has a voltage higher than the threshold value and a frequency higher than the first critical frequency fc1 and lower than the second critical frequency fc2 is applied from the electric supply source 408 to a circuit between the common electrode 406 and the segment electrodes 407. At the same time, the transmitted ultraviolet light 409 carrying the original image is applied to the complex.

Light-sensitive molecules exposed to ultraviolet rays 409 change their structure from trans-form 400*a* into cis-form 400*b*. Under the influence of the applied high-frequency electric field having the frequency lower than the second critical frequency cf2, the high-molecular liquid-crystals 402 are in scattering state.

Light-sensitive molecules 400 not exposed to ultraviolet radiation remain as be of trans-form. Under the influence of the applied high-frequency electric field having the frequency higher than first critical frequency cf1, the high-molecular liquid-crystals 402 are homeotropically aligned to be transparent. In short, the complex has the opaque areas exposed to the ultraviolet light and the transparent areas not exposed to the ultraviolet light. Namely, an inverse image of the original is written into the image input/output device 102.

The written image can be held unless an electric field having a voltage not less than the threshold value applied to or light of wavelength λ1 or λ2 is entered into the image input/output device 102.

An image optically written into the image input/output device 102 can be displayed thereon by using third light that is visible light not containing light of the frequency λ1 and, of course, light of the frequency λ2. The third light can not erase the written image since it does not change the form of the light-sensitive molecules 400.

Figure 12C:
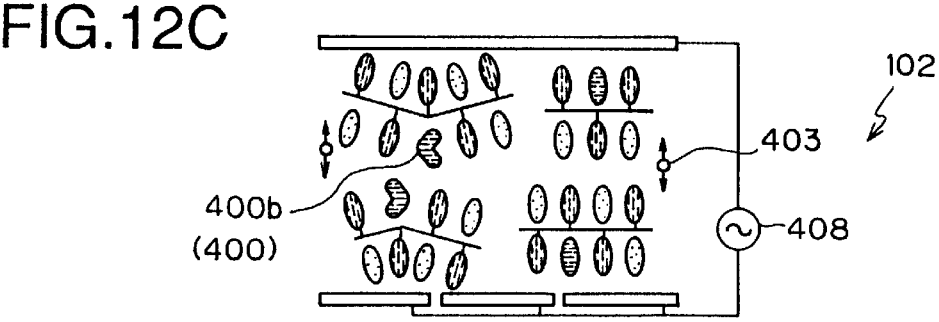
FIG. 12C is a view for explaining another operation of the image input/output device shown in FIG. 10.

Referring to FIG. 12C, the operation of the image input/output device 102 is described in Image-reading Mode for electrically reading an image written in the device 102.

A high-frequency electric field which has a voltage lower than the threshold value and a frequency higher than the first critical frequency fc1 is supplied from the power supply source 408 to the circuit between the common electrode 406 and the segment electrode 407. No light is applied in this instance.

The high-molecular liquid-crystals possess dielectric anisotropy. In other words, a change in alignment of the liquid-crystal molecules causes a change in dielectric constant across the common electrode 406 and segment electrodes 407. This means that alignment of the liquid-crystal molecules can be determined by detecting a dielectric constant for each pixel.

The written image is held in the image input/output device 102 since the applied voltage is smaller than the threshold value and no light is applied to the light-sensitive molecules 400.

Figure 12D:
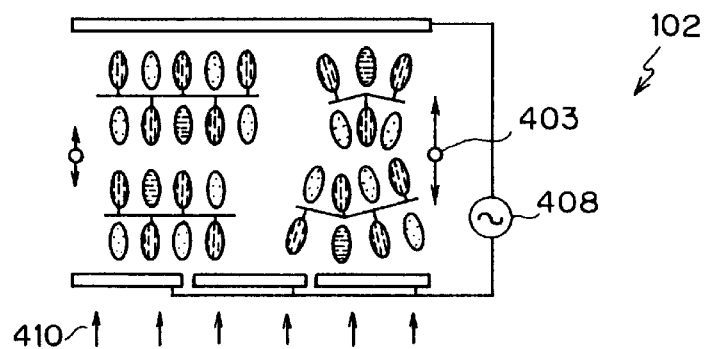
FIG. 12D is a view for explaining another operation of the image input/output device shown in FIG. 10.

Referring to FIG. 12D, the operation of the image input/output device 102 is described in Display Mode for displaying an input image by applying a low-frequency high-voltage to each electrically selected pixel (by a usual method of using a liquid crystal display panel).

In the Display Mode, a whole surface of the image input/output device 102 is always illuminated with back light 410. This back light 410 is visible light that contains light of wavelength λ1 and therefore can be used commonly as visible light 411.

I this mode, the light-sensitive molecules 400 have transform 400a under the influence of light of a frequency λ1.

A low-frequency electric field or a high-frequency electric field is selectively applied to each of pixels according to input image information. The electric supply source 408 generates a low-frequency field having a voltage greater than the threshold and a frequency lower than a first critical frequency (fc1) and a high-frequency field having a voltage greater than the threshold and a frequency higher than the first critical frequency (fc1) and selectively applies the electric field across the common electrode 406 and the segment electrodes 407 in such a way that the low-frequency electric field is applied to turned ON pixels and the high-frequency electric field is applied to turned OFF pixels of the input image according to the input image information. The ON pixels to which the low-frequency electric field of a frequency lower than the critical frequency (cf1) have a disturbed molecular alignment of high-molecular liquid-crystals 402 with large movements of ions 403. The OFF pixels whereto the high-frequency electric field of a frequency higher than the first critical frequency (fc1) is applied become transparent because the high-molecular liquid crystals 402 are aligned in the direction of the electric field due to their dielectric anisotropy with a small movement of ions 403.

Thus, an image can be written in the image input/output device 102 according to electrical signals of the input image information.

The device portion of the second embodiment is featured by the fact that it can work without polarizing plates. This enables the image input/output device 102 to effectively use a transmitted light of an input original image to be written therein.

In the first embodiment, the second-wavelength light transmitted through an original enters the image input/output device 102 through a polarizer. The light-sensitive molecules do not require polarization of light to which they react, but the polarizer is used for such reasons that frequently removing the polarizer every time before Display Mode operation is troublesome and requires a complicated mechanism. The transmission loss of light having passed the polarizer amounts 50%. There is a loss of light through the polarizer in the usual Display Mode.

On the other hands, the second embodiment in itself does not require any polarizer and can effectively use the transmitted image light to be written in the image input/output device 102. This enables use of a lamp having a smaller power, realizing reduction of the power consumption. With the same power lamp, this embodiment can write therein pixels of an original of a small light transmittance.

Figure 13:
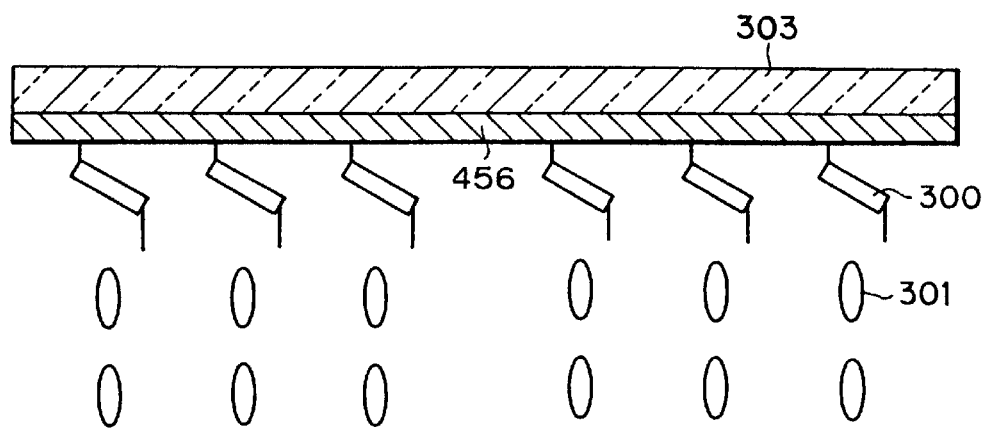
FIG. 13 is a sectional view of an input/output device according to a third embodiment of the present invention.

Referring to FIG. 13, an image input/output device 102 in a device portion according to a third embodiment of the present invention will be described below:

The image input/output device 102 is composed of light-sensitive molecules 300 and liquid crystal molecules 301, which are hermetically held between two transparent substrates 302 and 303. The transparent substrate 302 has a formed thereon thin-film transistor (TFF) 450 which is composed of a gate 451, a source 453, drain 454, a semiconductor 452 and an insulating film 455.

The gate 451 can be made of chromium (Cr) or tantalum (Ta) metal. The insulating film 455 is made of tantalum oxide. The semi-conductor 452, the source 453 and the drain 454 are made of amorphous silicone (a-Si).

One pixel is formed for a TFT which turns on and off said pixel. The above-described liquid crystal panel is the same as an active matrix type liquid-crystal panel.

The other transparent substrate 303 has a formed thereon common electrode 456 which is a transparent electrode such as ITO. The transparent substrate 303 has a thin layer of light-sensitive molecules 300, which is evenly formed thereon in the same way as shown in the first embodiment. This light-sensitive molecular layer acts as aligning film for the liquid-crystal molecules 301. The working principle of the light-sensitive molecules 300 acting on the molecular alignment of the liquid crystals 301 according to frequencies of light radiation is the same as described before. The construction of the light-sensitive molecules 300 and liquid-crystals 301 is not limited to that shown in FIG. 13. The mixture of light-sensitive molecules, high-molecular liquid crystals and low-molecular liquid crystals, like as shown in FIG. 10, is also applicable.

In the third embodiment, an active matrix type liquid-crystal cell based on TFTs can be used for optically writing an optical image directly into an image input/output device, electrically reading the written image and electrically reading an image. The use of the active matrix type liquid crystals creates an integrated image-input type display unit which is capable of displaying a high-contrast and highly fine image with a high response.

Figure 14:
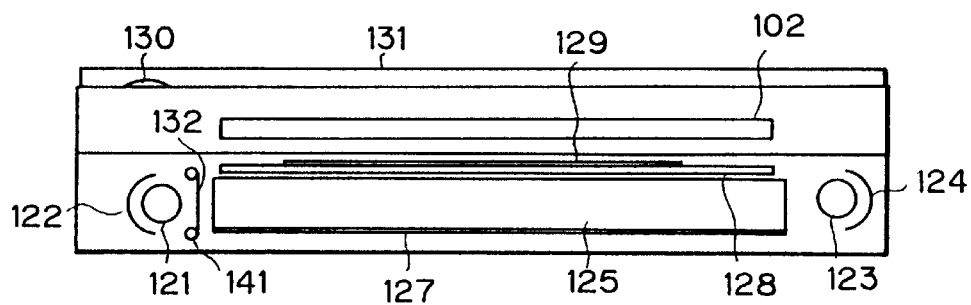
FIG. 14 is a sectional view of an illuminating portion of an image input type display unit which is the first embodiment of the present invention.

The construction and operation of the illumination light portion of the embodiment are now described in detail as follows:

FIG. 14 shows a section of the illuminating device according to the first embodiment of the present invention. The illuminating light generating portion 110 (FIG. 2) is composed of a first lamp 121, a second lamp 123, a first reflecting plate 122 and a second reflecting plate 124. The light control portion 111 (FIG. 2) is composed of a filter 132 and a light diffusing portion 112 (FIG. 2) is composed of a diffusing plate 125.

A first light emitted from the first lamp 121 is white light of a visible wavelength range. The first light contains light of a specified wavelength $\lambda 1$. Light emitted from the second lamp 123 is light of an ultraviolet wavelength range that contains light having a specified wavelength $\lambda 2$. The first lamp 121 is provided with the first reflecting plate 122 and the second lamp 123 is provided with the second reflecting plate 124. These reflecting plates assure effective light radiation of the diffusing plate 125. The diffusing plate 125 is provided at its bottom surface with a scattering light reflecting plate 127 to effectively return back the scattering light. The filter 132 is divided into two transmittal areas (a) (for allowing the first light to pass therethrough) and (b) (for absorbing the first light). The filter 125 having flexibility are fixed at its upper and lower edges to paired upper and lower rollers, respectively, of a light-filter lifting mechanism 141 with a driving micro-motor. The upper and lower rollers rotate from the micro-motor to set the filter so that light from the first lamp 121 can fall on the filtering area (a) or (b). When the first lamp 121 is turned ON, either one of the areas (a) and (b) is selected and set between the first lamp 121 and the diffusing plate 125.

The diffusing plate 125 has a transparent original holder 128 thereon. When observing an image displayed on a display screen of the image input/output device 102, only the first lamp 121 is turned ON and the light-transmitting area (a) of the filter 132 is selected in advance to allow the white light from the first lamp 121 to pass the image input/output device 102. Accordingly, the image input/output device 102 is supplied with the white light as back light and, at the same time, is given an image signal to be displayed. A user can see a sharp image displayed on the display screen of the image input/output device 102 as shown in FIGS. 3A and 3B.

In inputting an image, an original 129 is placed on the transparent original holder 129 and only the second lamp 123 is turned on to apply ultraviolet radiation to the image input/output device 102. The selector switch 130 is used for selectively switching on the necessary lamp.

Before observing the image thus written in the image input/output device 102, only the first lamp 121 is turned ON and the light-transmitting area (b) of the filter 132 is selected in advance to apply the third light (back light) to the image input/output device 102. In this case, the original 129 can be removed in advance if no need be.

The cover 131 is put on the image input/output device 102 to protect a user against ultraviolet radiation when inputting an image into the image input/output device 102. It is also possible to cover the viewing surface of the image input/output device 102 with a film allowing visible light but not allowing ultraviolet light instead of the cover 131.

The illuminating portion of the first embodiment is featured by the provision of the specially usable lamps 121 and 123 which can be simply switched over to the first visible light or the second ultraviolet light. The third light can be also obtained by filtering the first light from the first lamp 121 without using any additional lamp. An original 129 can be easily placed in the correct position on the image input/output device since the image input/output device 102 is initialized to transparent state before placing the original 129 thereon.

Figure 15:
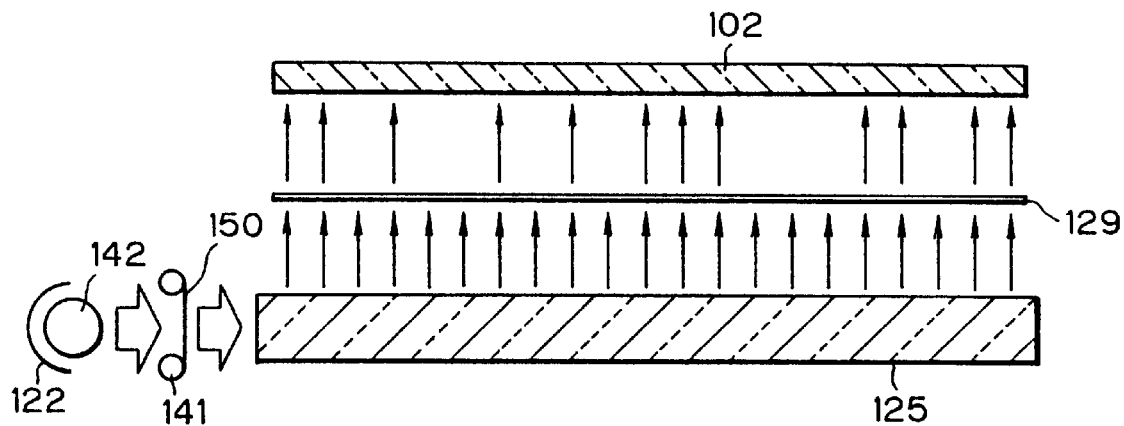
FIG. 15 is a sectional view of an illuminating portion of an image input type display unit which is the second embodiment of the present invention.

An illuminating portion of the second embodiment of the present invention is illustrated in section in FIG. 15.

In FIG. 15, components similar to those shown in FIG. 14 are given the same numerals. The description is focused at the different points of the illuminating portion from that of the first embodiment.

A lamp 142 is a light source that can emit light of a wide wavelength range from ultraviolet light to infrared light. The light radiation contains light of wavelengths $\lambda 1$ and $\lambda 2$. Light emitted from the lamp 142 together with light reflected from a reflecting plate 122 passes through a light filter 150 and enters a diffusing plate 125.

Figure 16:
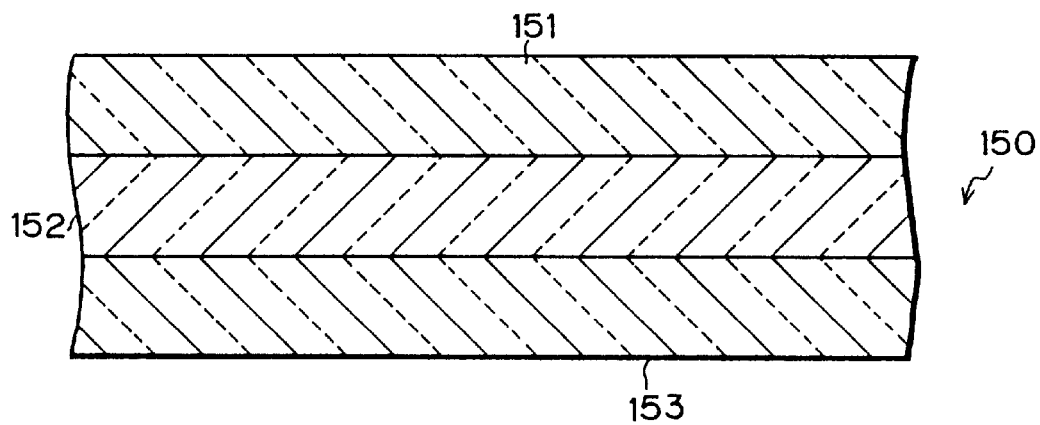
FIG. 16 shows a structure of a light filter used in the image-input type display unit shown in FIG. 15.

The light filter 150 is a flexible film having three filtering divisions (bands)—a first division 151, a second division 152 and a third division 153 as shown in FIG. 16. Characteristics of the light filter 150 is shown in FIG. 17. The first division 151 of the light filter has such a property that it rejects almost short-wavelength light of the second wavelength range but transmits almost all light of the first wavelength range as shown (a) in FIG. 17. This division is used for supplying visible white light as back light when displaying an image on the image input/output device 102 by applying a voltage thereto according to a display signal. The second division 152 possesses such a property that it rejects almost short-wavelength light of the first wavelength range but transmits almost all light of the second wavelength range as shown (c) in FIG. 17. This division is used for supplying the second wavelength-range light when reading therein an original image. The third division 153 possesses such a property that it rejects almost short-wavelength light of the second wavelength range but transmits almost all light of the first wavelength-range light excepting light of the wavelength $\lambda 1$ as shown (b) in FIG. 17. This division is used for supplying back light that can not cause the light-sensitive molecules to change their structure when reading out an original image written therein.

The light filter 150 is fixed at its upper edge and lower edge to an upper roller and a lower roller, respectively, of a filter winding mechanism 141 to expose one of three divisions of the filter to transmit a pass band of light from the lamp 142.

As describe before, the image input/output device 102 displays an image thereon in a usual mode by controlling the molecular alignment of liquid crystals under the influence of a voltage applied across the display electrodes. For this purpose, it is suitable to supply white light as back light of the liquid crystal display. Accordingly, the first division 151 of the filter 150 is set in advance to cover a whole surface of the light passage by using the filter winding mechanism 141. By doing so, the white light enters the image input/output device 102, making it easy to see the image displayed thereon. In this case, all light-sensitive molecules are exposed to light of the wavelength $\lambda 1$ contained in the white light and change their state into trans-form (first state). This itself has no influence to an image electrically displayed on the image input/output device 102. However, an image to be displayed on the image input/output device 102 may be erased all or partially if all or a part of the image relates to the cis-form (second state) of the light-sensitive molecules. Therefore, the first light is limited to illumination when electrically displaying an image.

In case of writing an original image into the image input/output device 102, the second division 152 of the filter 150 is set in advance to cover a whole surface of the light passage by using the filter winding mechanism 141. Consequently, only ultraviolet light (the second light)

through the filter 150 enters the diffusing plate 125 which causes the second light to be evenly diffused and directed up to the original 129 placed on the image input/output device 102. The second light transmitted with the image representing the original 129 through it enters the image input/output device 102 wherein the light acts on the light-sensitive molecules which changes their structure into cis-form and causes the liquid-crystals to change their molecular alignment. Thus, the original image is written in the image input/output device 102.

The third division 153 of the filter 150 is then set to cover a whole surface of the light passage by using the filter winding mechanism 141 when the original image written by the second light is further displayed on the image input/output device. Light having passed through the third division of the filter 150 is white light (the first light) wherefrom light of the wavelength λ1 is eliminated by the filter 150. The light enters the diffusing plate 125 through which it is evenly diffused and directed up. In this case, there is no original between the diffusing plate 125 and the image input/output device 102 and, therefore, the diffused light directly transmits through the image input/output device 102. Thus, the image can be observed on the screen of the display unit. In this case, the original image can be observed as be written since the light does not contains wavelengths λ1 and λ2 and, therefore, does not cause any change in the state of the light-sensitive molecules.

Although the described filter has the second division having the property shown (c) in FIG. 17, it may have the second division that has a peak transmittance of light having the wavelength λ2 changing the light-sensitive molecules into the second state and has a very small transmittance of light having other wavelengths than the wavelength λ2.

A cover is put on the image input/output device 102 to protect a user against ultraviolet radiation when inputting an image into the image input/output device 102. It is also possible to cover the viewing surface of the image input/output device 102 with a film allowing visible light but not allowing ultraviolet light instead of the cover.

The illuminating portion of the second embodiment is featured by using one lamp 142 in combination with the light filter 150 to easily obtain three kinds of light, i.e., the first light, the second light and the third light. The use of a single lamp enables saving in size of the device body and saving in manufacturing cost. An original 129 can be easily placed in the correct position on the image input/output device 102 since the device 102 is initialized to transparent state before placing the original thereon.

Figure 18A:
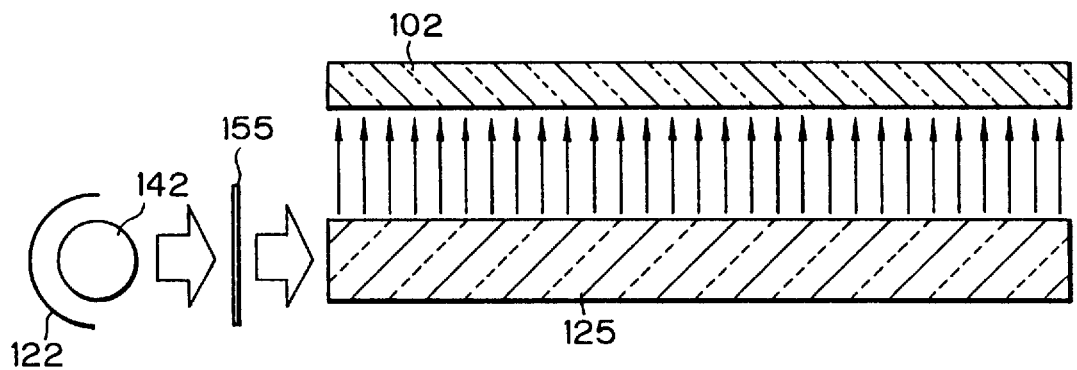
FIG. 18A is a sectional view of an illuminating portion of image-input type display unit working for displaying an image, which device is the third embodiment of the present invention.
Figure 18B:
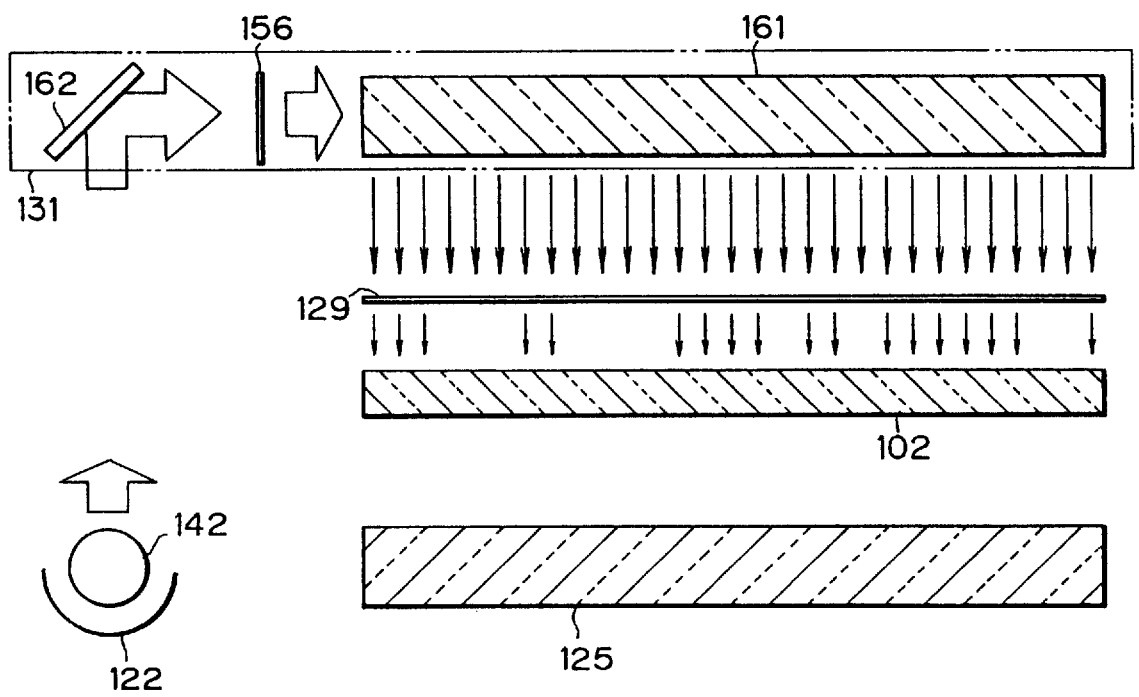
FIG. 18B is a sectional view of an illuminating portion of image-input and display device working for reading an image, which device is the third embodiment of the present invention.

An illuminating portion of the third embodiment of the present invention is shown in FIGS. 18A and 18B. Components similar to those shown in drawings of the first and second embodiments are given the same numerals. The description relates to the different points of the illuminating portion from those of the first and second embodiments.

FIG. 18A is illustrative of the illuminating portion of the third embodiment working when displaying an image thereon.

A lamp 142 shown in FIGS. 18A and 18B is equivalent to the lamp 142 shown in FIG. 15. A first light filter 155 has a light-transmitting portion [a] having the property shown (a) in FIG. 17 and a light-transmitting portion [b] having the property shown (b) in FIG. 17. These two portions can be switched over to each other. Light emitted from the lamp 142 together with light reflected from a reflecting plate 122 passes through the first light filter 155 and enters a diffusing plate 125. Light having passed the first light-transmitting portion [a] of the first light-filter 155 is first light that contains light having a wavelength Al and is used as back light for displaying an image on an image input/output device 102. Light having passed the second light-transmitting portion [b] of the first light-filter 155 is third light that does not contain light having a wavelength Al and is used as back light when displaying an optically written image on the image input/output device.

The first light or the third light is evenly diffused upward over a whole surface of the diffusing plate 125. The diffused light from the diffusing plate 125 directly passes through the image input/output device 102 to display an image thereon.

FIG. 18B shows the operation of the third embodiment when reading (writing) an original image into the image input/output device 102. In this case, an original 129 is placed on the image input/output device 102 and a cover 131 is laid thereon. The cover 131 is provided with an upper diffusing plate 161, a second light filter 156 and a mirror 162 for reflecting light from the lamp 142 toward the upper diffusing plate 161.

The lamp (light source) 142 and the reflecting plate 122 can change the direction of light radiation upward. This can be realized by rotating the lamp 142 united with the reflecting plate 122 by 90° about an axis of the lamp 142. Upward light is reflected from the mirror 162 of the cover 131 and enters through the second light filter 156 into an upper diffusing plate 161 of the cover 131. The second filter 156 possesses the output characteristic shown (c) in FIG. 17. Accordingly, the light entering the upper diffusing plate 161 is the second light that is then evenly diffused downward over the whole bottom surface thereof. The second light from the upper diffusing plate 161 passes an original 129 inserted between the upper diffusing plate 161 and the image input/output device 102. The transmitted light then enters the image input/output device 102 wherein the second light representing an original image is written.

The illuminating portion of the third embodiment is featured in that its body is made in a single piece (without dividing upper and lower parts) allowing accommodation therein connection wirings with the image input/output panel and thus simplifies the construction of the whole system. The cover 131 has only optical parts and does not contain any electrical circuit, eliminating the need for wiring between the body and the cover. There is no fear of exposing observer's eyes to ultraviolet radiation since the latter directed downward when inputting an image into the image input/output device.

Figures 20A, 20B:
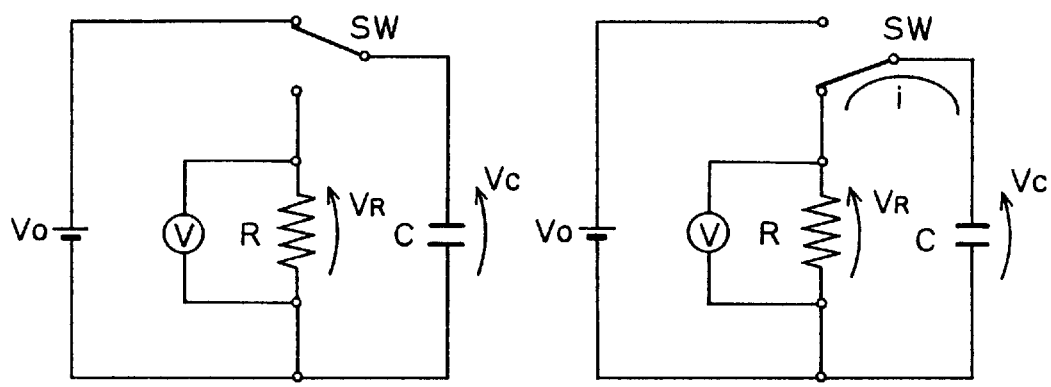
FIG. 20A is an equivalent circuit diagram representing one pixel of duty-type liquid crystal while being charged.
FIG. 20B is an equivalent circuit diagram representing one pixel of duty-type liquid crystal while being discharged.

The reading portion of the embodiment will be described below in detail:

FIG. 19 shows a reading portion that is an extraction of components directly relating to image reading-out operations from the wholesystem shown in FIG. 2. A control circuit 105 controls a drive control circuit 106 and readout circuit 108 according to a signal of judgment what operation mode (display, image-input or read-out) is selected. The read-out circuit 108 controls drive control circuit 106 to apply an adequate voltage waveform across segment electrodes and a common electrode only when reading-out an image written in the image input/output device. The principle of electrically reading a written image is as follows:

According to the present invention, an optically written information is recorded in terms of a change in relative permittivity $\epsilon$ per pixel. Accordingly, the information can be read-out by determining a change of the permittivity $\epsilon$ of each pixel. As shown in FIGS. 20A and 20B, a pixel of liquid crystal is supposed to be a capacitor and composes a capacitor in an electric circuit including a detecting resistance R and an electric source. The resistance of the liquid crystal itself is very small to be negligible. An electrode including its wiring has a resistance but is omitted for simplicity of explanation. FIG. 20A shows the so-called "charging" state of a capacity detection circuit in which a voltage is applied to the liquid crystal. FIG. 20B shows the so-called "discharging" state of the circuit in which a charge accumulated in the liquid crystal is discharging.

Capacity of a liquid crystal can be expressed as follows:

$$C=\epsilon S/d \quad (1)$$

where S is a surface of an electrode and d is a distance between electrodes. As the expression (1) indicates, a change of C is proportional to a change of $\epsilon$. Accordingly, a change of value C is detected.

The pixel is now charged by applying a voltage Vo thereto (FIG. 20A). At a moment t=0 after the pixel was charged to the steady-state, switch SW is open to discharge (FIG. 20B). The voltage Vo is selected so that it may not change the information that the liquid crystal has. In this instance, a voltage VR(t) applied across a resistance R is determined by solving the following equation of the circuit:

$$VR(t)=Vo \exp(-t/RC) \quad (2)$$

Figure 21:
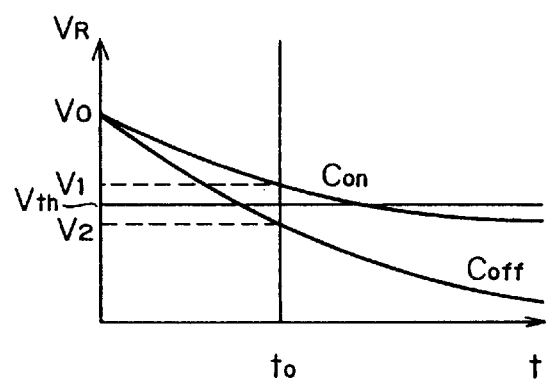
FIG. 21 is illustrative of a waveform of a signal for detecting a capacity of one pixel.

A relationship between the voltage VR(t) and the time moment (t) is shown in FIG. 21. The capacity Con of a pixel bearing an image information is more than the capacity Coff of a pixel not bearing image information. Accordingly, a change of the voltage VR(t) in the state of Con differs from that of the voltage VR(t) in the state Coff.

A value of VR at a moment t=t0 is determined and the determined value is then compared with a preset threshold voltage Vth. It may be judged that there is information if VR is larger than Vth or there is no information if VR smaller than Vth.

The above-described operation relates to one pixel of the liquid crystal display. However, the reading portion must act as a scanner for reading all pixels information. Accordingly, the reading portion reads information by line by line-sequential scanning just like in displaying an image. If one line consists of m pixels, the reading portion is provided with switches, A–D converters and comparators for m pixels respectively to treat with data for m pixels at a time. As electrodes including its wiring have respective resistance values depending on pixels' locations, which were omitted for simplicity of explanation, the pixels must have respectively preset threshold voltage values Vth.

Figure 22:
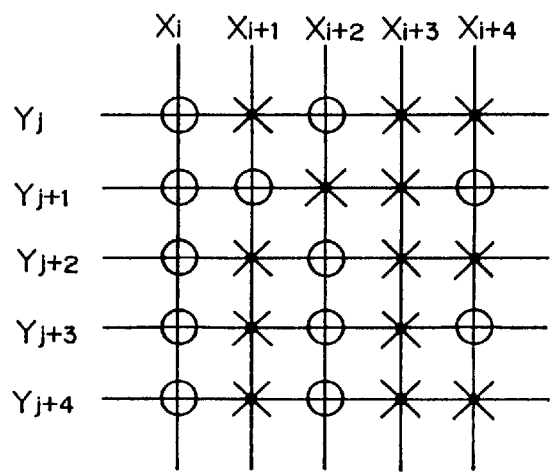
FIG. 22 shows an arrangement of electrodes and pixels for explaining an image-reading method.
Figure 23:
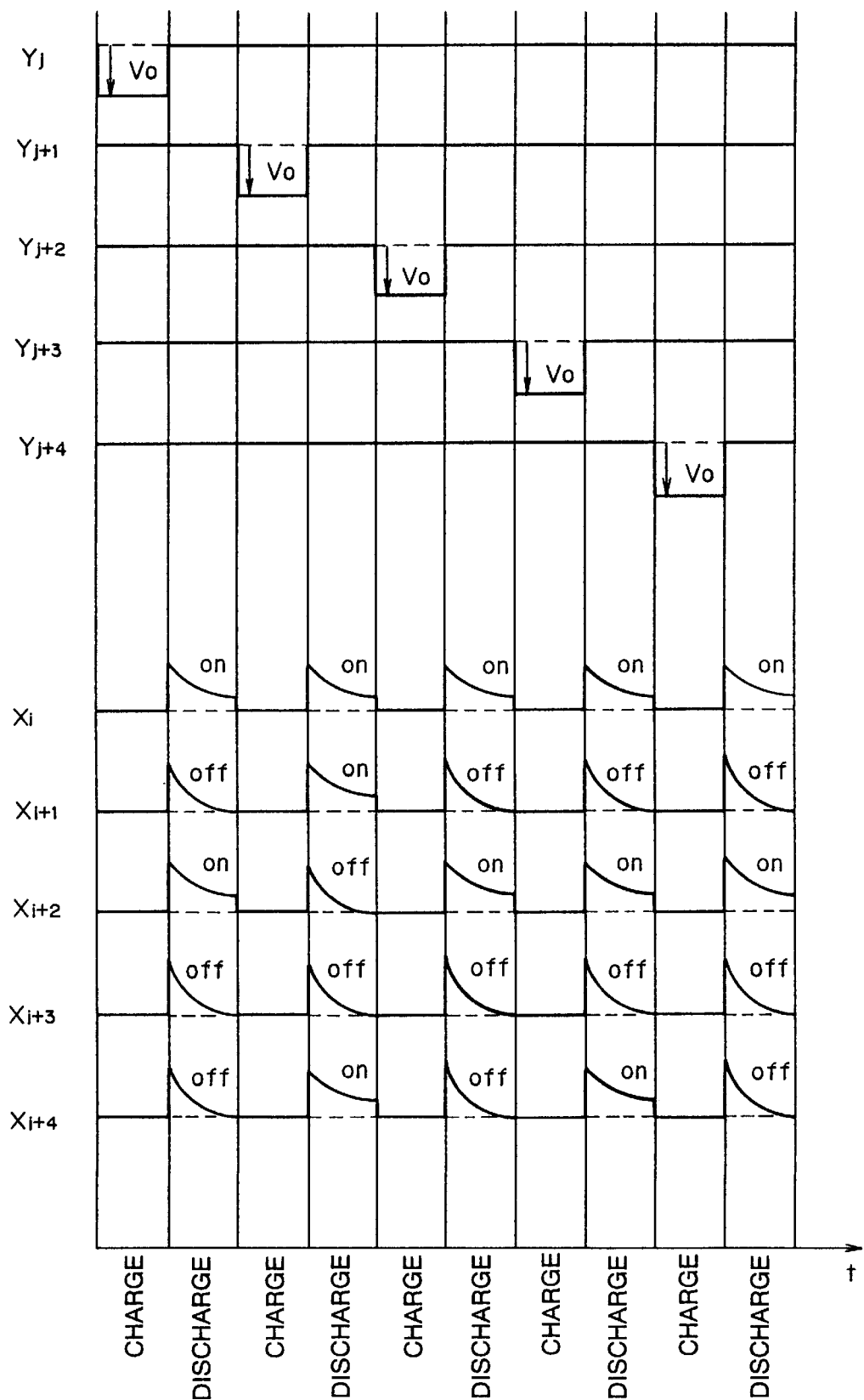
FIG. 23 shows applied pulses and obtained signal waveforms, which are used for explaining an image-reading method.
Figure 24:
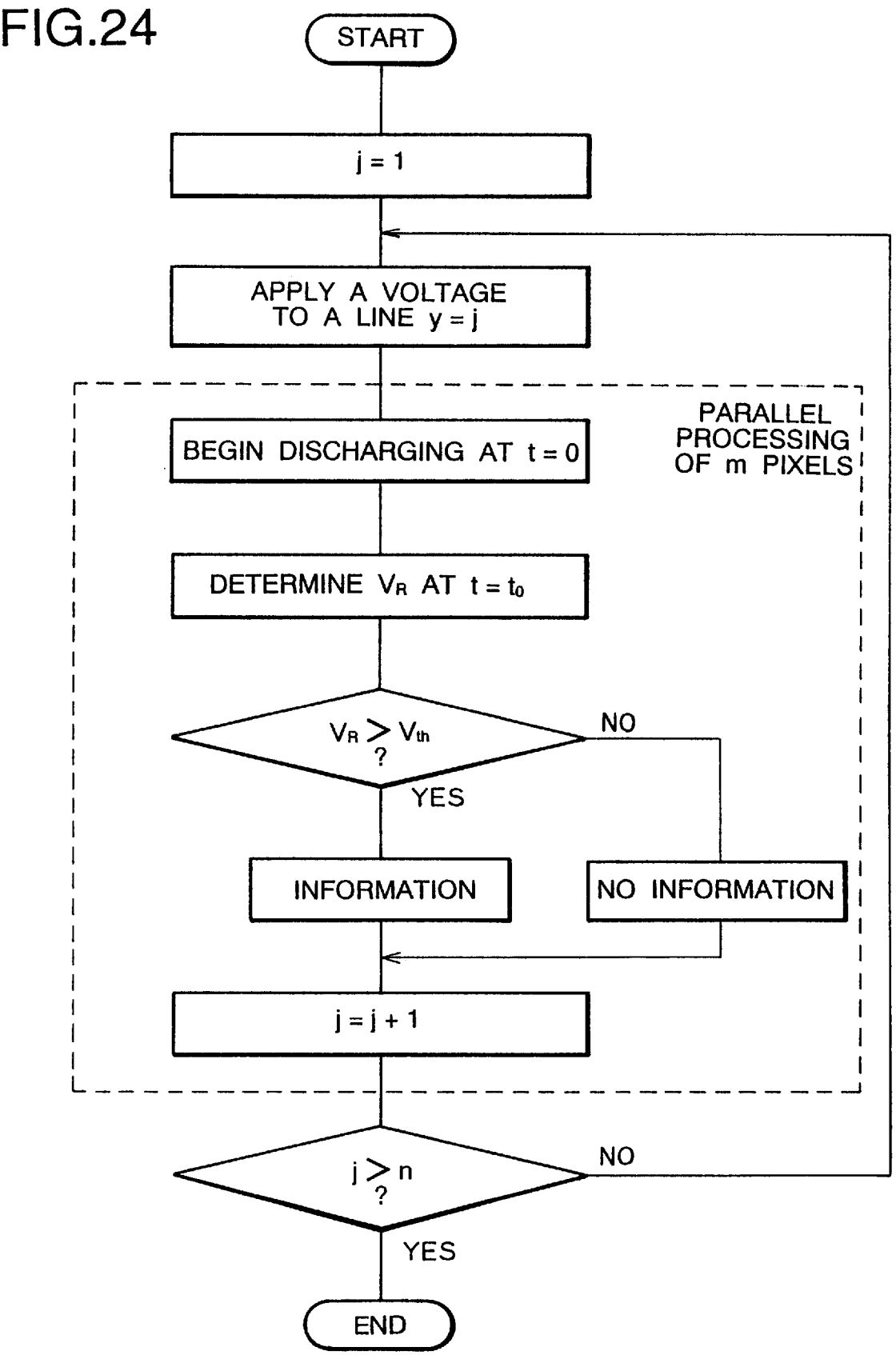
FIG. 24 is a flow chart for explaining an image-reading method.

A practical reading method is described as follows:

It is supposed that an image shown in FIG. 22, by way of example, have been recorded in the image input/output device. In FIG. 22, white-circles ($\bigcirc$)-marks indicate pixels having information recorded thereon (capacity Con) and x-marks indicate pixels having no information recorded thereon (capacity Coff). Segment electrodes are designated by Xi–Xi+4 respectively and common electrodes are designated by Yj–Yj+4 respectively. In reading the written image, a voltage is applied across a common electrode in line-sequence. At this time, a voltage applied across each segment electrode is kept at 0 V. The charging period is followed by the discharging period. For the discharging period, a detected voltage on each segment electrode varies as shown in FIG. 23. However, a change of the voltage for each pixel Con quite differs from a change of the voltage for each pixel Coff. Accordingly, a voltage is detected on respective segment electrodes in a line at a certain moment of time after the beginning of the discharge period and converted from analog to digital values which are then compared by the comparator with corresponding threshold voltage values preset for the respective pixels to determine whether each of the pixels has information or not. In the case of FIG. 21, the pixel Con is judged to have image information since its voltage V1 detected at t=t0 is grater than its threshold voltage Vth whilst the pixel Coff is judged to have no-information since its detected voltage V2 is smaller than its threshold value Vth. FIG. 24 is a flow chart describing the above-mentioned reading operation procedure, where the liquid crystal panel is composed of m×n pixels.

Figure 25:
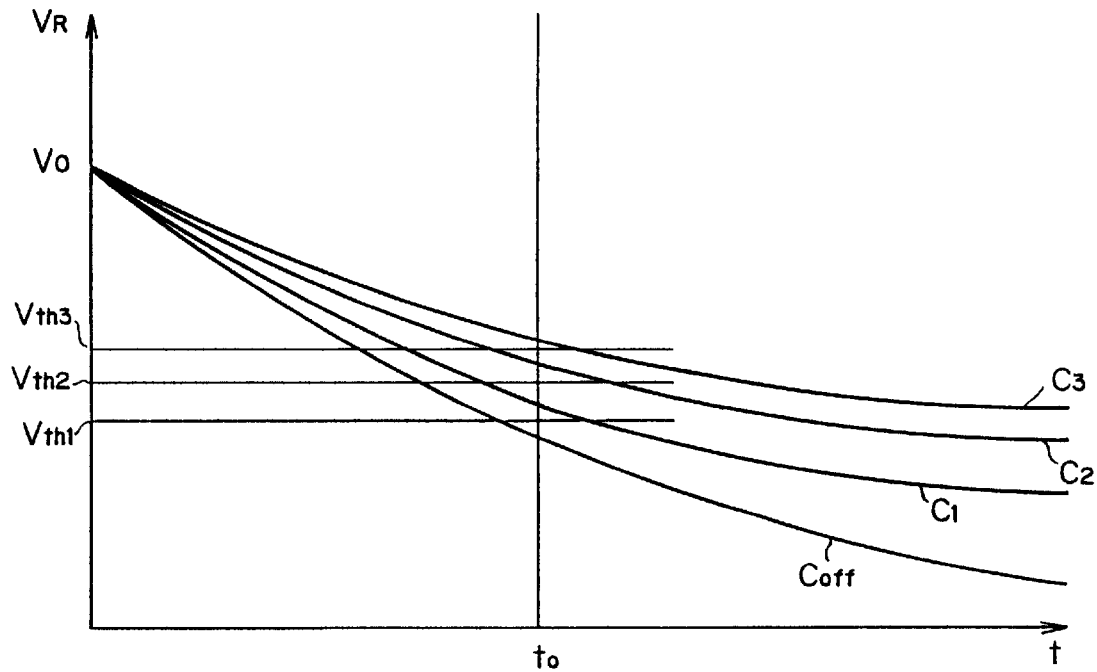
FIG. 25 is illustrative of a signal waveform for explaining a multivalue-detection method.

Although the above-mentioned process treats with binary recorded information (ON or OFF), the display unit according to the present invention can treat with multi-valued records of an image information. FIG. 25 is a view for explaining the principle of detecting 4-valued information. The capacity of pixels of a liquid-crystal panel after optically writing an original image therein changes to Coff, C1, C2 and C3 (Coff<C1<C2<C3) according to gradation of the original image. In this case, it is possible to determine the capacity state of each pixel by presetting three thresholds (Vth1, Vth2 and Vth3) for discriminating 4 states of pixel capacities. Namely, the number of thresholds is determined by subtracting one from the number of gradation steps to be detected. This enables reading an image information with gradation steps.

Figure 26:
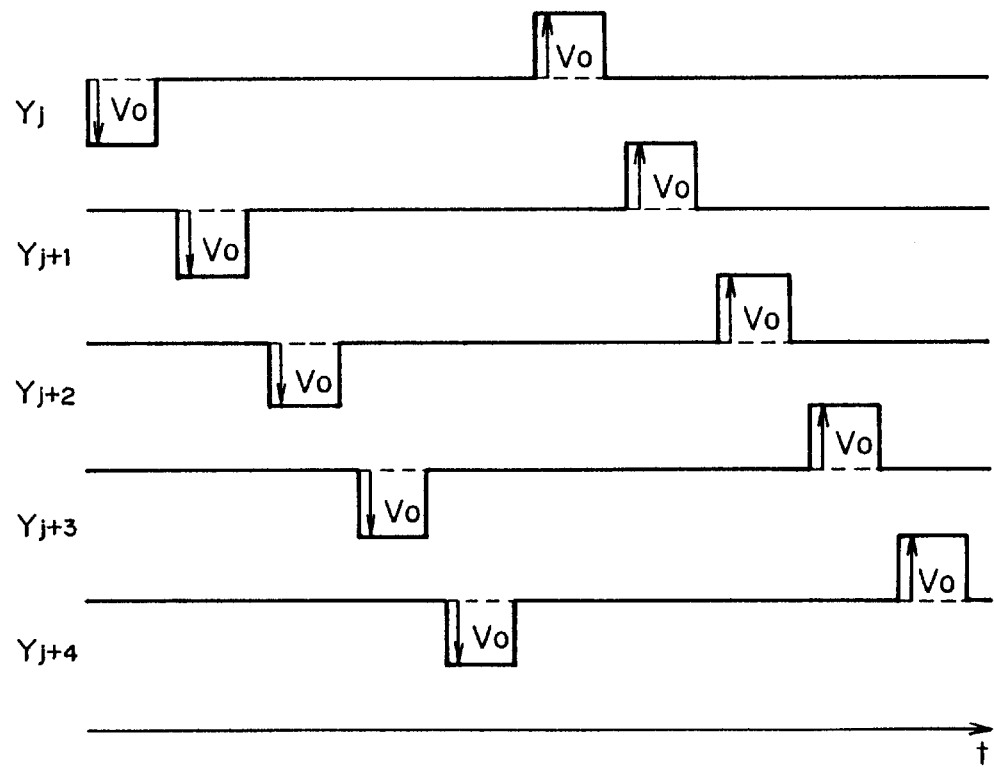
FIG. 26 is a view for showing waveforms of pulses applied for reading an image.

To avoid impairment of a liquid crystal panel by applying a DC voltage thereto, the polarity of the applied voltage is usually inverted at a certain interval of time when displaying an image on the panel. This is also realized in reading written information by the embodiment according to the present invention. Namely, one scan is performed with a negative voltage (−Vo) applied and next scan is performed with a positive voltage (Vo) applied, as shown in FIG. 26. These cycles are then repeated. By doing so, the impairment of liquid crystals can be prevented.

Figure 27:
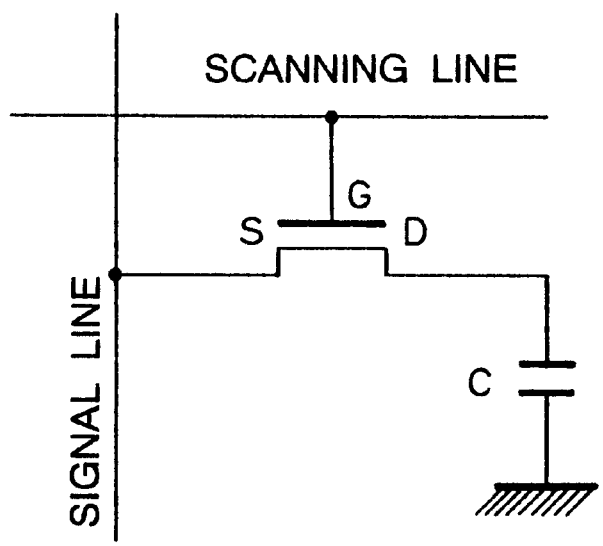
FIG. 27 is an equivalent circuit representing one pixel of a TFT type liquid crystal.

A method of reading an information in an active matrix type TFT liquid-crystal panel is described as follows:

An equivalent circuit of one pixel for the TFT liquid-crystal panel is illustrated in FIG. 27. A thin film transistor (TFT) is placed at an intersection in matrix of signal lines and scanning lines. A gate is connected to a scanning line, a source is connected to a signal line and a drain is connected to a capacity of a liquid crystal. The TFT acts as a switch which maintains ON while reading information written in the liquid crystal whose capacity is therefore connected to the signal line. In this instance, a resistance value of the TFT being in ON position is omitted for simplicity of explanation as the resistance of the electrode including its wiring was omitted when explaining the embodiment with the duty type liquid crystal panel. Thus, the reading circuit may be considered to be the same as those shown in FIGS. 20A and 20B. In this instance, the circuit being charged is as shown in FIG. 20A whilst the circuit being discharged is as shown in FIG. 20B. Accordingly, the reading method may be the same as in duty type liquid crystal panel.

Figure 28:
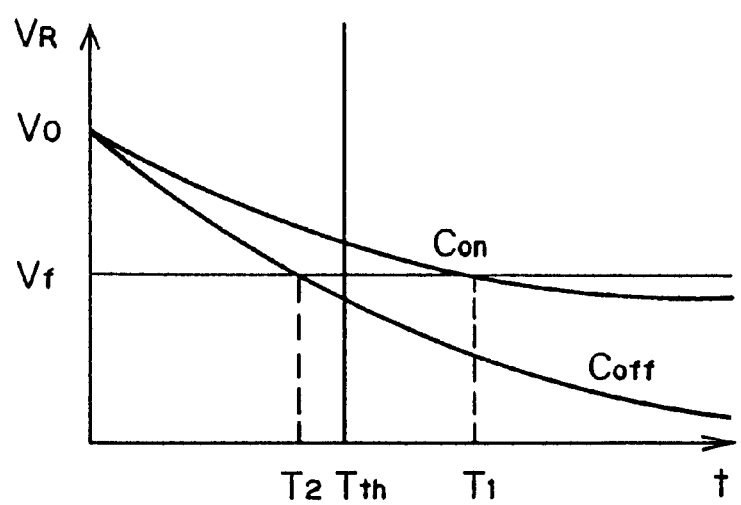
FIG. 28 is illustrative of another signal waveform for detecting a capacity of one pixel of liquid crystal.

Next, another method of judging whether a pixel has information or not is described below:

The before-described method (FIG. 21) is such that a voltage detected for a pixel at a specified time is compared with a preset threshold voltage Vth to determine the pixel has information if the detected value is grater than the threshold. Another method shown in FIG. 28 is such that a pixel is judged to have information by determining a time for which the detected voltage of the pixel reached a certain voltage Vf (<V0) and comparing the determined time with a preset threshold time Tth. In FIG. 28, a pixel Con is judged to have information since a time T1 for which a detected voltage VR becomes equal to the voltage Vf is longer than the preset threshold time Tth whilst a pixel is judged to have no information since a time T2 for which VR becomes equal to Vf is shorter than Tth. Time is measured by a counter.

Figure 29:
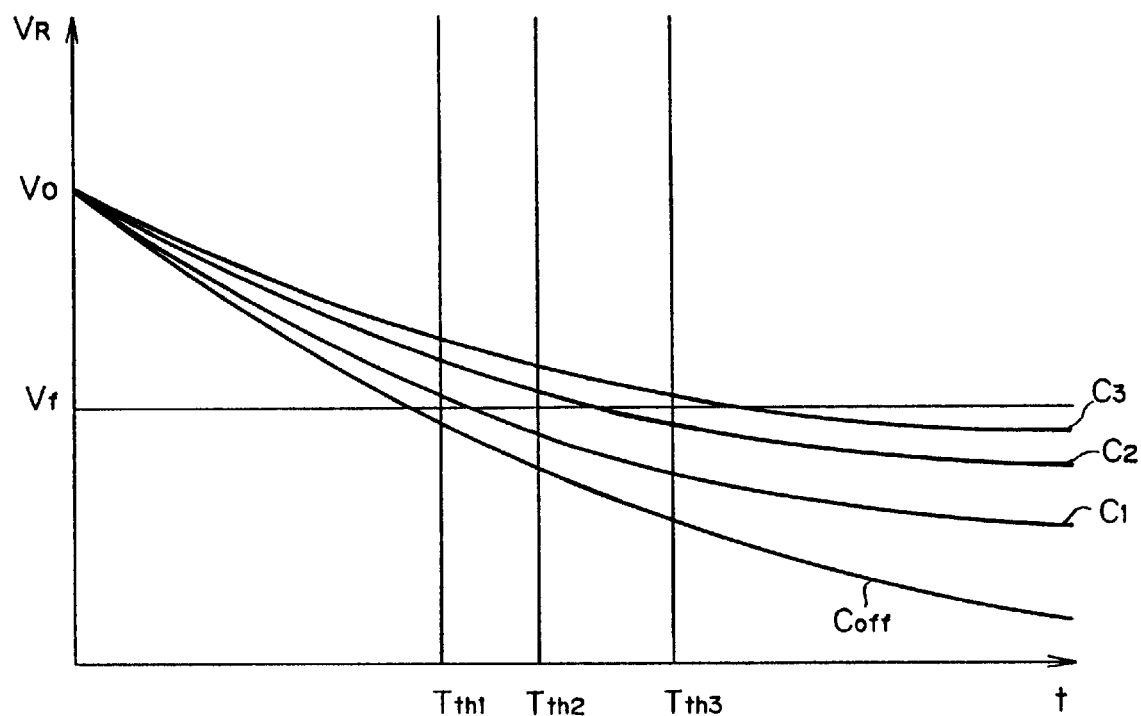
FIG. 29 is illustrative of another signal waveform for explaining a multivalue-detection method.

The detection of multi-valued records of an image information was described before with reference to FIG. 25. This is also realized by using threshold time values. Namely, 4-value information, for example, can be detected by providing three thresholds of time duration (Tth1, Tth2, Tth3) as shown in FIG. 29. In this instance, the state of each pixel is discriminated as one of 4 states. The number of thresholds is determined by subtracting one from the number of gradation steps to be detected. This enables reading an image information with gradation steps.

(1) The integrated image-input type display unit according to the present invention has a single unit capable of realizing both functions of displaying an image thereon and writing/reading an image therein and therefrom by using a liquid-crystal cell liquid-tightly holding therein liquid-crystal molecules together with light-sensitive molecules and by commonly using electrodes for image displaying and image inputting. This enables the display unit to be simple, small and inexpensive to manufacture.

This display unit can optically inputting a multi-gradational image and electrically reading the inputted image since the liquid crystal cell contains very small light-sensitive molecules. The liquid crystal cell exhibits high input-light sensitivity since it contains a vast number of light-sensitive molecules dispersed therein and can obtain sufficiently large signals of a high signal-to-noise ratio to be electrically read-out. The resolution of electrically read image is defined by the density of first-group electrodes and second-group electrodes. In the display unit according to the present invention, an electric signal of each pixel reflects an average density of pixels (not discretely sampled density) since there are a large number of dispersed light-sensitive molecules therein. The signal is free from moire pattern thanks to the effect of a low-pass filter used.

Furthermore, this display unit according to the present invention has such a function that temporarily stores an input image in the image input/output device by keeping the molecular alignment of liquid crystals therein. This enables the display unit to sequentially input an image in the image input/output device and electrically reading the input image stored therein. The flexibility of the system is thus increased. Accordingly, the image input/output device can display a still picture without being always supplied with electric signals for display image. This can save the power consumption of the display unit.

(2) Another integrated image-input type display unit according to the present invention offers, in addition to the features of the above-mentioned item (1), a wide selection of liquid crystals to be used in the liquid crystal cell. Namely, it may use twisted nematic liquid crystals or supper-twisted nematic liquid crystals that can be used with a low voltage and at a low power consumption. Accordingly, this display unit is suitable for use in driven personal computers or potable information terminals.

(3) Another integrated image-input type display unit according to the present invention offers, in addition to the features of item (1), the following advantageous features:

It uses a liquid crystal cell containing therein high-molecular liquid crystals, low-molecular liquid crystals and light-sensitive molecules, which liquid crystal cell does not require polarizers and which, therefore, can effectively use light for inputting an image therein and light for displaying an image thereon. This enables the use of a lamp having a reduced illuminating power and lower power consumption.

(4) Another integrated image-input type display unit according to the present invention, in addition to the features of the above-mentioned item (1), is further featured by using an image input/output device which is similar in construction to a duty-type liquid-crystal panel and which can be manufactured at a low cost by relatively simple method.

(5) Another integrated image-input type display unit according to the present invention, in addition to the features of the above-mentioned item (1), is further featured by using an image input/output device which is similar in construction to a TFT type liquid-crystal panel and which can display a video image having a high contrast and fine resolution in display mode.

(6) Another integrated image-input type display unit according to the present invention, in addition to the features of the above-mentioned item (1), is further featured by using simplified detection means and has a plurality of threshold voltages to read the gradation of an original image.

(7) Another integrated image-input type display unit according to the present invention, in addition to the features of the above-mentioned item (1), is further featured in that a voltage value detected by detection means is converted into time value. This enables the device to be digitalized: a digitized circuit can be easily prepared at a low cost.

The resolution can be easily improved by changing a clock of a counter. The gradation of an original can be read out by detecting multi-value information. This does not requires the provision of a plurality of reference voltages. The inexpensive detecting means can detect information at a high accuracy.

(8) Another integrated image-input type display unit according to the present invention, in addition to the features of the above-mentioned item (1), is further featured in that an image input/output device can directly display thereon an input image which was optically input therein. The image input/output device contains a vast number of very fine light-sensitive molecules. Accordingly, an optically input image has a very high resolution. Namely, the very-high resolution image can be displayed in case displaying an optically input image.

(9) Another integrated image-input type display unit according to the present invention, in addition to the features of the above-mentioned item (1), is further featured by using simplified illuminating means. The body of the display unit can be thus miniaturized and manufactured at a low cost.

(10) Another integrated image-input type display unit according to the present invention, in addition to the features of the above-mentioned item (1), is further featured in that it assures safety operation: there is no fear of exposing observer's eyes to ultraviolet radiation since the latter directed downward when inputting an image into the image input/output device.

We claim:

1. An integrated image-input type display unit which comprises:

an image input/output device composed of: a liquid-crystal cell, the cell containing light-sensitive molecules capable of changing their structure to a first molecular structure when being irradiated with light of a first wavelength and to a second molecular structure when being irradiated with light of a second wavelength and liquid crystal molecules capable of changing their alignment in accordance with the structural change of the light-sensitive molecules, both kinds of molecules being hermetically sandwiched between two transparent substrates; a first group of electrodes; and a second group of electrodes;

first electrode-driving means for driving the first group of electrodes; second electrode-driving means for driving the second group of electrodes;

illuminating means for irradiating the image input/output device with light of the first wavelength and light of the second wavelength;

reading means for reading capacities produced at places corresponding to intersection points formed between the first-group electrodes and the second-group electrodes in accordance with a pulse voltage applied to the first-group electrodes; and control means for controlling the first electrode driving means, the second electrode driving means, the illuminating means and the reading means in such a manner that, when displaying an image, a first image is displayed on the image input/output device by changing the alignment of the liquid crystal molecules corresponding to intersection points between the first group electrodes and the second electrodes with light of first wavelength and, when inputting an image, a second image is inputted into the image input/output device by irradiating with light of the second wavelength, a pulse voltage is applied to the first group of electrodes and capacities at places corresponding to intersection points between the first-group electrodes and the second-group electrodes are read to read the second image.

2. An integrated image-input type display unit as defined in claim 1, wherein the light-sensitive molecules are fixed to at least one of two transparent substrates.

3. An integrated image-input type display unit as defined in claim 1, wherein the liquid crystal molecules are a mixture of high-molecular liquid crystals and low-molecular liquid crystals and said mixture and the light-sensitive molecules are dispersed in the liquid crystal cell.

4. An integrated image-input type display unit as defined in claim 1, wherein the first group electrodes are formed on one of the transparent substrates and the second group electrodes are formed on the other transparent substrate.

5. An integrated image-input type display unit as defined in claim 1, wherein the first group electrodes and the second group electrodes are formed on one of the transparent substrates, switching elements are formed one at each of intersection points formed between the first group electrodes and the second group electrodes and a common electrode is formed on the other transparent substrate.

6. An integrated image-input type display unit as defined in claim 1, wherein the reading means is composed of voltage detecting means for detecting a voltage in response to the capacity after the elapse of a certain time and voltage comparing means for comparing the detected voltage value with a specified voltage value.

7. An integrated image-input type display unit as defined in claim 1, wherein the reading means is composed of voltage detecting means for detecting a voltage in response to the capacity and time measuring means for measuring a time until the detected voltage reaches a specified voltage value.

8. An integrated image-input type display unit as defined in claim 1, wherein the illuminating means is capable of irradiating the image input/output device with light of a third wavelength not to change a state of the light-sensitive molecules when displaying a second image inputted into the image input/output device.

9. An integrated image-input type display unit as defined in claim 1, wherein the illuminating means uses a common light source capable of generating the first-wavelength light and the second-wavelength light and is provided with light wavelength separating means for separating the first-wavelength light from the second-wavelength light.

10. An integrated image-input type display unit as defined in claim 1, wherein the illuminating means uses a common light source capable of generating the first-wavelength light and the second-wavelength light and is provided with light-guide means for irradiating with the first-wavelength light through one of the transparent substrate and with the second-wavelength light through the other transparent substrate.

* * * * *